US006272130B1

(12) United States Patent
Panahi et al.

(10) Patent No.: US 6,272,130 B1
(45) Date of Patent: Aug. 7, 2001

(54) TIME DIVISION MULTIPLEXER-DEMULTIPLEXER AND METHOD OF OPERATION THEREOF

(75) Inventors: Allen Panahi, Sierra Madre; Freddie Lin; Tomasz P. Jannson, both of Torrance, all of CA (US)

(73) Assignee: Physical Optics Corporation, Torrance, CA (US)

( * ) Notice: Subject to any disclaimer, the term of this patent is extended or adjusted under 35 U.S.C. 154(b) by 0 days.

(21) Appl. No.: 09/008,849

(22) Filed: Jan. 19, 1998

Related U.S. Application Data

(63) Continuation of application No. 08/784,351, filed on Jan. 16, 1997.

(51) Int. Cl.[7] .............................. H04L 12/50; H04J 3/04; H04J 3/02
(52) U.S. Cl. ......................... 370/366; 370/535; 370/538
(58) Field of Search ................................. 370/366, 352, 370/353, 425, 426, 375, 522, 466, 535, 538, 464, 294

(56) References Cited

U.S. PATENT DOCUMENTS

| | | |
|---|---|---|
| 5,278,687 | 1/1994 | Jannson et al. |
| 5,457,556 * | 10/1995 | Shiragaki ........................ 359/117 |
| 5,479,202 | 12/1995 | Beriont . |
| 5,566,169 * | 10/1996 | Rangan et al. ................... 370/366 |
| 5,583,855 * | 12/1996 | Ball .................................... 370/376 |
| 5,864,415 * | 1/1999 | Williams et al. ................. 359/125 |

OTHER PUBLICATIONS

*IPITEK Fiber Optics*, Singlemode 1310/1550nm WDM, "Wavelength Division Multiplexers".
Hewlett Packard, "Gigabit Rate Transmit Receive Chip Set", Technical Data, pp. 5–151, 5–152, 5–157, and 5–161.
Advanced Micro Devices, Am7968/Am7969, "TAXIchip™ Integrated Circuits".

* cited by examiner

*Primary Examiner*—Alpus H. Hsu
*Assistant Examiner*—Duc Ho
(74) *Attorney, Agent, or Firm*—Nilles & Nilles, S.C.

(57) ABSTRACT

Systems and methods for time division multiplexing are described. A time division multiplexer-demultiplexer system includes I) a signal transmitting system for transmittal of a serialized signal including A) latency free continuous data and B) at least one member selected from the group consisting of bursty data and packetized data, the signal transmitting system including a multiplexer and a timing control block; and II) a signal receiving system for reception of the signal without disrupting the laminarity of the latency free continuous data, the signal receiving system including a demultiplexer and a sequence detector. The systems and methods provide advantages in that continuous data can be simultaneously transmitted with bursty data and/or packetized data on the same tie line without disrupting the laminarity of the continuous data.

30 Claims, 16 Drawing Sheets

| DATA TYPE | MULTIPLEXER/ DEMULTIPLEXER INTERFACE REQUIREMENT | DATA RATE | TIMING SENSITIVITY |
|---|---|---|---|
| AUDIO/ VIDEO MULTIMEDIA | • CONTINUOUS SAMPLING<br>• LOCK MATCHING<br>• MINIMUM BUFFERING | VARIABLE BIT RATE IN COMPRESSED MODE<br><br>UNCOMPRESSED DEPENDS ON RESOLUTION & SAMPLING RATE | AUDIO/ VIDEO SYNCHRON- IZATION |
| RS232/422/485 SERIAL ASYNCHRONOUS<br><br>SCSI PARALLEL<br><br>BUS SYNCHRONIZED | CAN USE BUFFER OR LOW SPEEDS<br><br>USE OVERSAMPLING<br><br><br>REQUIRE FIFO MEMORY | VARIBLE 10kb/s → 10Mb/s<br><br><br>VARIABLE → 40 MBYTE/s | BAUD RATES NEED MATCHING<br>— — — — —<br><br>INTERLOCKED HANDSHAKE BUS TIMING SYNCHRON- IZATION |
| T1 | NEED DIRECT MATCHING OF T1 CLK WITH MUX SYNCHRONIZATION OF MASTER CLOCK | 1.544 Mb/s | CLOCK RECOVERY VERY STRICT TIMING REQUIRE- MENT CLK 1.544 ± 32PPN |
| LAN { FDDI / 10 BASE T / 100 BASE T } NETWORK | NEED CLOCK RECOVERY<br>MINIMUM BUFFER AND STRICT DATA RATE MATCHING USING SHALLOW FIFO | 100 Mb/s<br><br>10 Mb/s<br><br>100 Mb/s | CLOCK RECOVERY REQUIRED ELASTIC BUFFER<br>CLOCK RECOVERY NEEDED<br>CLOCK RECOVERY NEEDED |
| WIDE AREA<br><br>ST1/ST3<br><br>ATM | PRECISE NEED CLOCK RECOVERY AND DEFRAMING WITH TRANSFER TO PACKET | 51.84/155.5 OC1/OC3 Mb/s | TIME/STAMP REQUIREMENT<br><br>CLOCK CORRECTION |

*FIG. 13A*

| Delay/Latency Sensitivity | Traffic Type | Data Stream | Applications | Remarks Type of Channel |
|---|---|---|---|---|
| Constant for minimum jitter | Constant bit rate | Laminar bit stream | Multimedia teleconferencing video conferencing security | Isochronous |
| Jitter requirement (not very tight) | Variable bit rate | | Computer to computer / peripheral Computer to memory | Asynchronous Bus synchronous |
| Minimum jitter requirement for voice Min. acceptable latency ~150 ms | Constant bit rate | | Telephony wide area | Synchronous |
| Max. elasticity function of network/token rotating times | Bursty asynchronous packetized | | Optical network in backbones | Bursty packetized |
| Collision domain limited | Asynchronous | | LAN | Asynchronous |
| Collision domain limited | Asynchronous | | LAN | Asynchronous |
| Variable latency depending on traffic Min. latency and jitter requirement for voice/telephone and multimedia traffic | VBR: Variable bit rate CBR: Constant bit rate ABR: Available bit rate Asynchronous Transfer Mode Asynchronous | | Wide area network | Can map ATM cells to FDDI packets and then transfer synchronously |

FIG. 13B

TIME DIVISION MULTIPLEXER-DEMULTIPLEXER AND METHOD OF OPERATION THEREOF

CROSS REFERENCE TO RELATED APPLICATIONS

This application is a Continuation of U.S. Ser. No. 08/784,351, filed Jan. 16, 1997, pending.

BACKGROUND OF THE INVENTION

1. Field of the Invention

The present invention relates generally to the field of multiplexing and demultiplexing. More particularly, the present invention relates to time division multiplexers-demultiplexers. Specifically, a preferred embodiment of the present invention relates to a time division multiplexer-demultiplexer (mux-demux) arrangement where continuous data can be transferred together with bursty data and/or packetized data on the same tie line without disrupting the laminarity of the continuous data. The present invention thus relates to time division multiplexers-demultiplexers of the type that can be termed latency free.

2. Discussion of the Related Art

Historically, it was known in the prior art to combine multiple signals on a single tie line using time division multiplexing-demultiplexing. Prior art time division multiplexers of the type hereunder consideration, sometimes called TDMs, are well-known to those skilled in the art. A typical time division multiplexer combines (serializes) a set of parallel signals into a single bit stream while the corresponding time division demultiplexer decombines (deserializes) the single bit stream back into the set of parallel signals. For example, a conventional time division multiplexer can be provided as part of a transmitting user apparatus and combined into a communications system with a time division demultiplexer that is provided as part of a receiving user apparatus.

As is known to those skilled in the art, multiple sets of parallel signals from multiple transmitting users can be multiplexed into a single bit stream and then demultiplexed. This has utility where there are fewer tie lines (e.g., optical fibers) available than the number of transmitting users.

What is also known to those skilled in the art is that time sensitive data such as audio and video must be transmitted with laminarity in order to appear to be in real-time with full-motion and without significant jitter. Thus, a previously recognized problem has been that time sensitive data loses its laminarity when it is time division multiplexed-demultiplexed with bursty data and/or packetized data on a single tie line. What is needed therefore is a solution that permits the time division multiplexing-demultiplexing of continuous data with bursty data and/or packetized data on a single tie line without disrupting the laminarity of the continuous data.

SUMMARY AND OBJECTS OF THE INVENTION

A primary objective of the present invention is to provide a time division multiplexer and/or a time division demultiplexer which can transfer continuous data (e.g., video and audio) with bursty data (e.g., Ethernet) and/or packetized data (e.g., asynchronous transfer mode (ATM)) on a single tie line and without disrupting the laminarity of the continuous data. Another object of the invention is to combine a drop-add switch with the time division multiplexer and/or the time division demultiplexer so as to provide a networkable multiplexer and/or demultiplexer. Another object of the invention is to combine a 2:1 bypass switch with the time division multiplexer and/or the time division demultiplexer so as to provide a capability for the use of tie line redundancy and a self healing ring capability. Another object of the invention is to combine a wavelength division multiplexer with two or more of the time division multiplexers and/or the time division demultiplexers operating in parallel so as to enhance the bandwidth of a given tie line arrangement. Another object of the invention is to provide an apparatus that is cost effective. Another object of the invention is to provide an apparatus that is rugged and reliable, thereby decreasing down time and operating costs. It is yet another object of the invention to provide an apparatus that has one or more of the characteristics discussed above but which is relatively simple to manufacture and assemble using a minimum amount of equipment.

In accordance with a first aspect of the invention, these objects are achieved by providing an apparatus comprising I) a signal transmitting system for transmittal of a serialized signal including A) latency free continuous data and B) at least one member selected from the group consisting of bursty data and packetized data, said signal transmitting system including a multiplexer and a timing control block; and II) a signal receiving system for reception of said signal without disrupting the laminarity of the latency free continuous data, said signal receiving system including a demultiplexer and a computing device, such as, for example, a state machine. In one embodiment, the apparatus further comprises a drop-add switch connected to said multiplexer and/or said demultiplexer. In another embodiment, the apparatus further comprises a 2:1 bypass switch for tie line redundancy connected to said demultiplexer. In another embodiment, the apparatus further comprises a wavelength division mux/demux to increase bandwidth. Preferably, the signal transmitting system and signal receiving system operate entirely at the physical layer.

Another object of the invention is to provide a method that can be used to simultaneously transfer continuous data with packetized data and/or bursty data on the same tie line without disrupting the laminarity of the continuous data. It is another object of the invention to provide a method that is predictable and reproducible, thereby decreasing variance and operating costs. It is yet another object of the invention to provide a method that has one or more of the characteristics discussed above but which is relatively simple to set up and operate.

In accordance with a second aspect of the invention, these objects are achieved by providing a method comprising II) providing said apparatus; II) transmitting said signal on said single tie line using said signal transmitting system, wherein transmitting includes encoding a clock with said timing control block; and III) receiving said signal from said single time line using said signal receiving system, wherein receiving includes recovering said clock with said computing device. In one embodiment, the step of providing includes providing a drop-add switch for dropping and adding signals, said drop-add switch being connected to both said multiplexer and said demultiplexer and, further comprising, reconfiguring said drop-add switch using data from said signal.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore nonlimiting, embodiments illustrated in the drawings accompanying and forming a part of this specification, wherein like reference numerals designate the same elements in the several views, and in which:

FIGS. 13A and 13B illustrate a plurality of different protocols which can be used in conjunction with the present invention.

DESCRIPTION OF PREFERRED EMBODIMENTS

Figure 1:
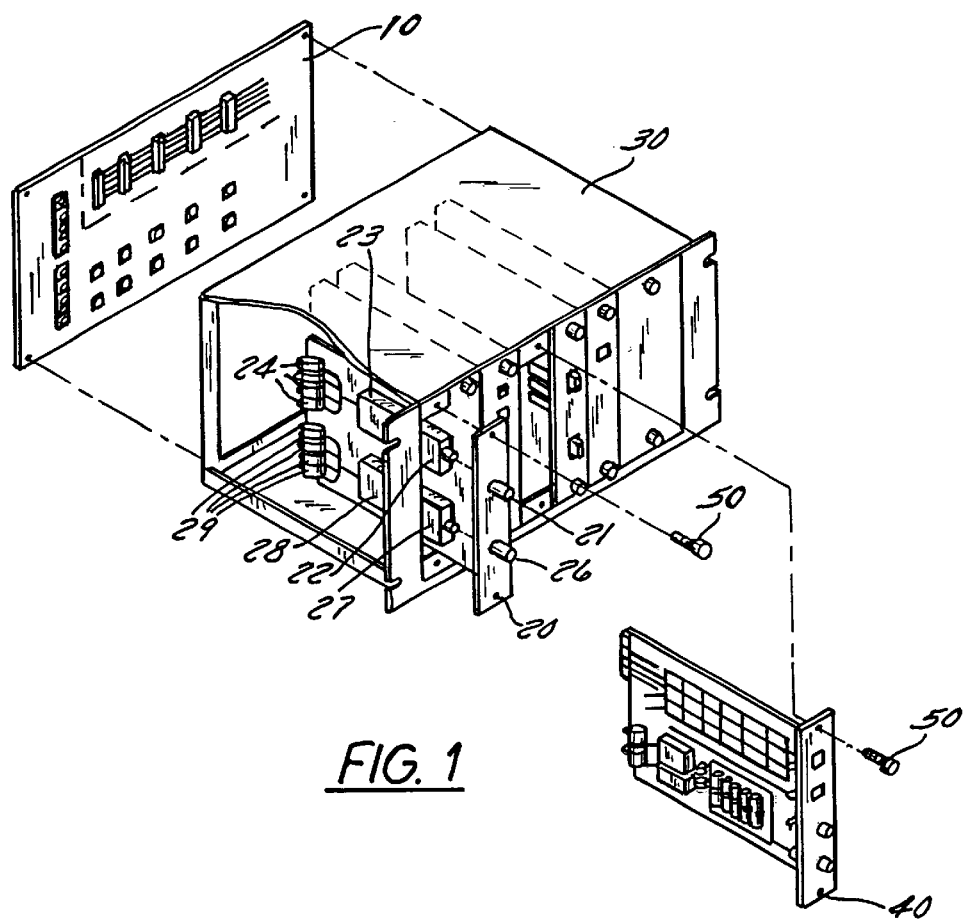
FIG. 1 illustrates a perspective view of a time division multiplexer-demultiplexer system according to the present invention.

The present invention and the various features and advantageous details thereof are explained more fully with reference to the nonlimiting embodiments that are illustrated in the accompanying drawings and detailed in the following description. It should be noted that the features illustrated in the drawings are not necessarily drawn to scale. Descriptions of well known components and processing techniques are omitted so as to not unnecessarily obscure the present invention in detail.

Referring to FIG. 1, a rack mounted embodiment of the invention is depicted. An electrical backplane 10 provides data transmission power, ground and management control functions. A mux/demux card 20 is removably installed in a chassis 30. The mux/demux card 20 is electrically connected to the electrical backplane 10. The mux/demux card 20 includes an optical input 21 and an optical output 26. Tracing the input subcomponents, the optical input 21 is optically connected to an optical-electronic transducer 22. The optical-electronic transducer 22 is electrically connected to a time division demultiplexer 23, which in turn is electrically connected to a plurality of connectors 24. The plurality of connectors 24 are electrically connected to the electrical backplane 10. Tracing the output subcomponents backwards, the optical output 26 is optically connected to an optical-electronic transducer 27. The optical-electronic transducer 27 is electrically connected to a time division multiplexer 28, which in-turn is electrically connected to a plurality of electrical connectors 29. The plurality of electrical connectors 29 are electrically connected to the electrical backplane 10.

Still referring to FIG. 1, a data-channel card 40 is also removably installed in the chassis 30. The data channel card 40 is electrically connected to the electrical backplane 10 and thereby indirectly connected to the optical input 21 and the optical output 26. The function of the data-channel card 40 is to connect a specific user (not shown) to the optical input 21 and the optical output 26. Both the mux/demux card 20 and the data-channel card are retained in chassis 30 by a bolt 50.

Figure 2:
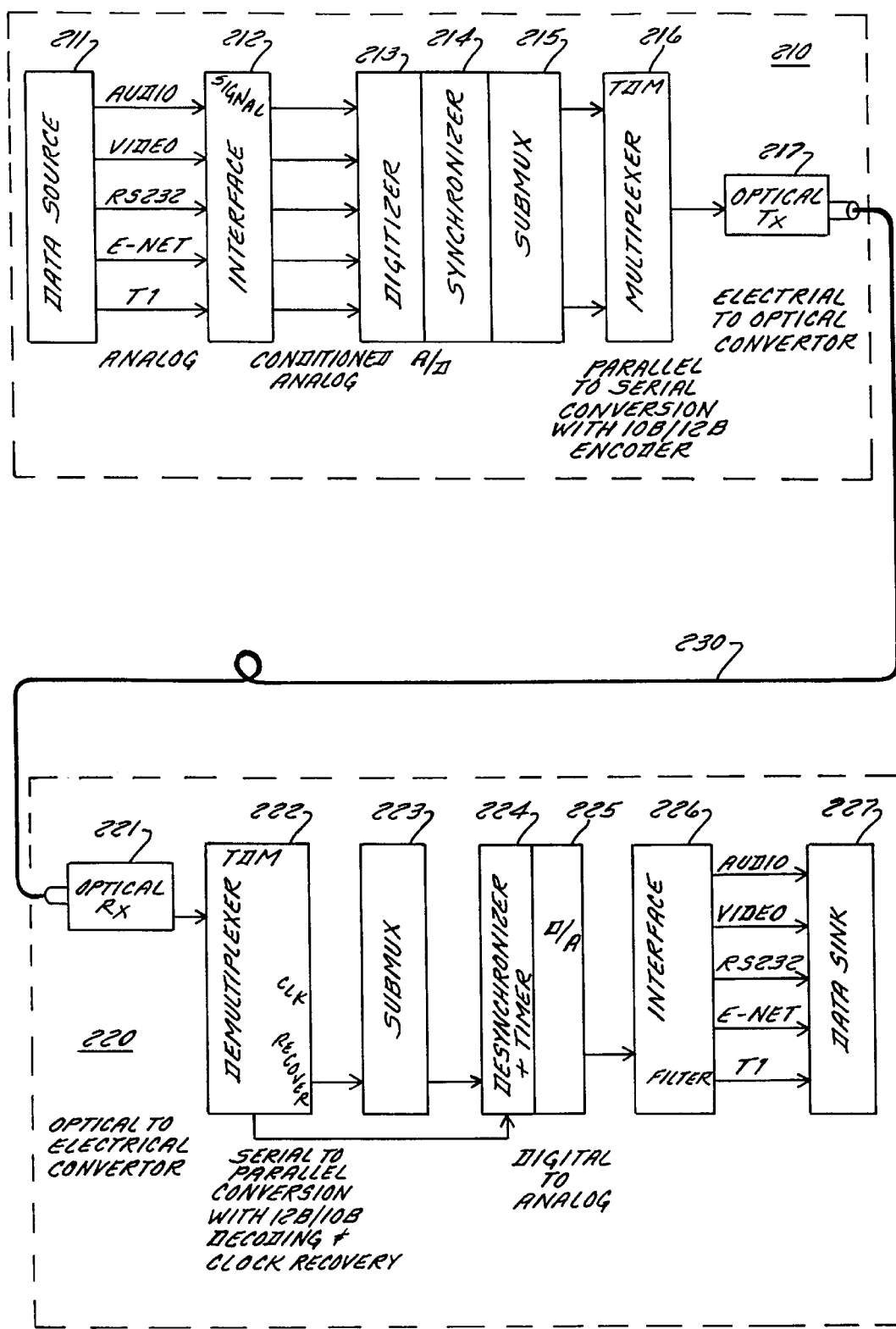
FIG. 2 illustrates a high level block diagram of a time division multiplexer connected to a time division demultiplexer with a fiber optic tie line according to the present invention.

Referring now to FIG. 2, a time division multiplexer system 210 is.connected to a time division demultiplexer system 220 with a fiber optic tie line 230. The time division multiplexer system 210 includes a data source 211 that is generating continuous audio, continuous video, RS232, Ethernet and T1 data. The data source 211 is electrically connected to a signal interface 212 which can condition the data, for example, by filtering. The signal interface 212 is electrically connected to a digitizer 213 that performs an analog to digital conversion of the data types that are not already digital (e.g., the continuous audio and video). The digitizer 213 is electrically connected to a synchronizer 214 that performs timing functions and buffering. More specifically, synchronizer 214 can include a first-in-first-out memory buffer. The synchronizer 214 is electrically connected to a submux apparatus 215. The submux apparatus 215 is electrically connected to a time division multiplexer 216. After parallel to serial conversion with 10B/12B encoding, the data is electrically transmitted to an electrical-to-optical convertor 217. (The 10B/12B encoding maps ten input bits to twelve output bits. During decoding, the twelve output bits are then decoded to the original ten input bits. This encoding/decoding operation is performed in order to assist synchronization and clock recovery by preventing long strings of 0's and 1's.)

The electrical-to-optical convertor 217 is optically connected to the optical fiber tie line 230. Tie line 230 can be many miles long so the invention is applicable to wide area networks as well as metropolitan area networks and local area networks.

Still referring to FIG. 2, the time division demultiplexer system 220 is connected to tie line 230 via an optical-to-electrical convertor 221. The convertor 221 is electrically connected to a time division demultiplexer 222 wherein serial to parallel conversion with 12B/10B decoding and clock recovery takes place. (The clock recovery is an important part of the invention and particular embodiments of the clock recovery process will be described in more detail below.) The resulting parallel data is electrically conveyed to a subdemultiplexer 223. The subdemultiplexer 223 is electrically connected to a desynchronizer and timing apparatus 224. Apparatus 224 can include a FIFO and a computing device, such as, for example, a state machine.

Apparatus 224 is electrically connected to a digital to analog convertor 225 which converts the data that is to be used in analog form (e.g., the continuous audio and video data). Convertor 225 is electrically connected to an interface 226 where the parallel data is reconstructed and conditioned and the analog components thereof can be filtered. Interface 226 is electrically connected to a data sink 227. Data sink 227 can be a terminal, a personal computer, a file server or even a router switcher that can be a conduit to one or more networks.

The functionality of the time division multiplexer 216 and the time division demultiplexer 222 can be provided by standard off-the-shelf components. Although almost any commercial mux-demux set can be used, an example of a specific pair of time division mux-demux chips that are suitable for use with the invention are the Am7968/Am7969 transparent asynchronous Xmitter-Receiver Interface (TAXI) integrated circuits which are readily commercially available from Advanced Micro Devices (AMD). The Am7968/Am7969 circuits can provide a data transfer rate of up to 175 Mbaud, serially in point-to-point communication with up to 12 bits. In a specific embodiment of the invention, the Am7968/Am7969 circuits are used to perform a 10 bit mux/demux with clock recovery and 10B/12B encoding/decoding.

In this embodiment, a 12 MHz sampling of 10 bit data requires a data transfer rate of 120 Mbits/second (Mb/s) for transfer of all ten bits. With 10B/12B encoding the resulting serial baud rate that is required increases to 144 Mbaud.

If one of the bits to be transferred includes a T1 signal, the sampling rate should be phase locked to 1.544 MHz (the T1 standard rate). So instead of a 12 MHz sampling rate, a sampling rate that is a multiple of 1.544 MHz should be used. Choosing an oversampling rate of 8 results in a data transfer rate of 12.352 Mb/s for the T1 bit stream. Again using 10B/12B encoding, the resulting optical transfer rate that is required in this case increases to 148.2 Mbaud.

Another example of a specific pair of time division mux-demux chips that are suitable for use with the invention are the HDMP-1000 Tx/Rx Pair gigabit rate transmit receive chips which are readily commercially available from Hewlett Packard. The HDMP-1000 Tx/Rx circuits can provide a data transfer rate of up to 1400 Mbaud, serially in point-to-point communication with up to 21 bits.

Figure 3:
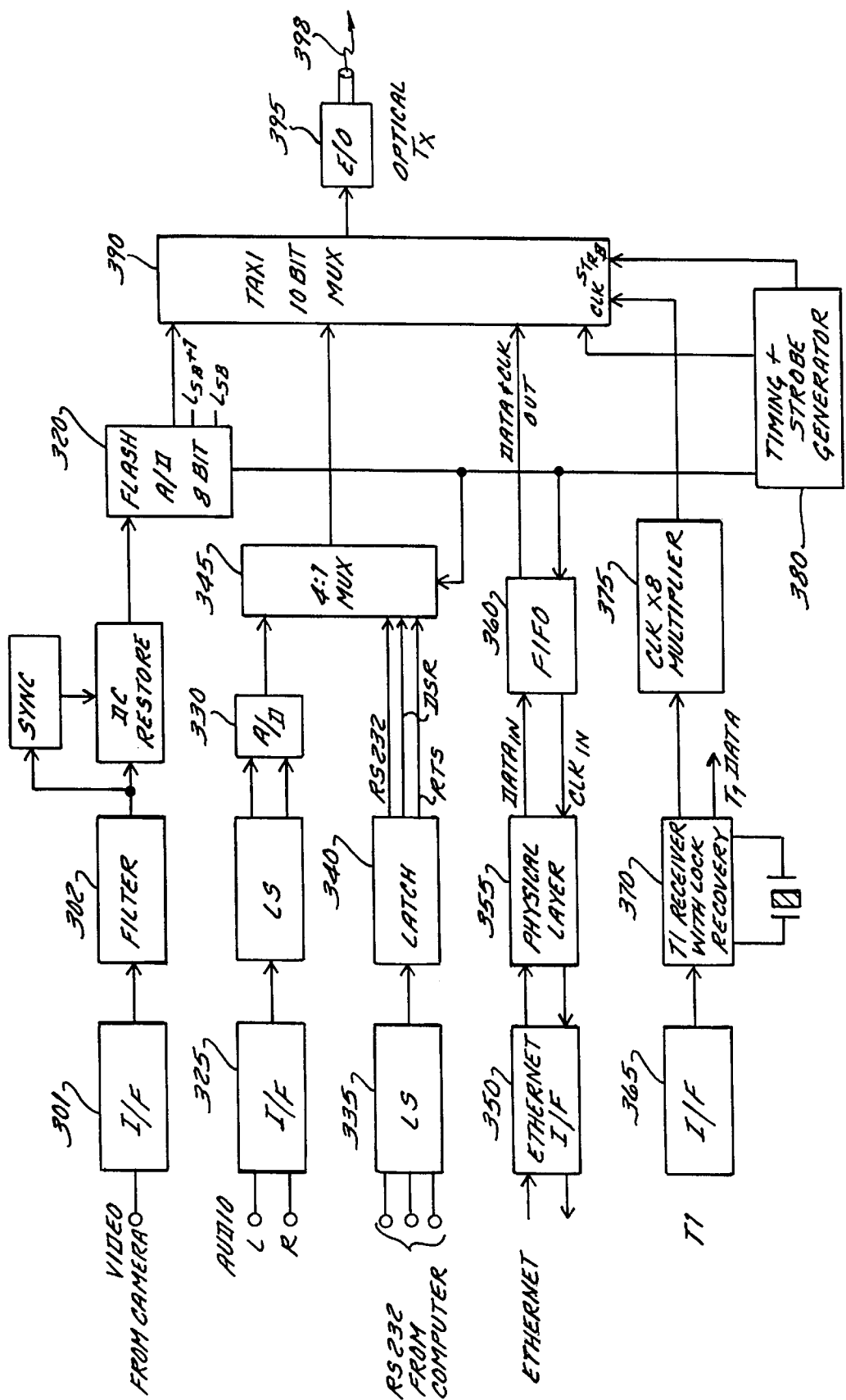
FIG. 3 illustrates a block diagram of a time division multiplexer according to the present invention.

Referring now to FIG. 3, a time division multiplexer system includes an Am7968 time division multiplexer circuit 390 and is configured to transmit continuous video, continuous audio, RS232, Ethernet and T1 signals. A video signal enters the system at a video interface 301 that is electrically connected to a filter 302. The video is then routed to a flash analog-to-digital convertor 320 which connects the filter 302 to the time division multiplexer 390. The audio signal enters the system at an audio interface 325 that is connected to an analog-to-digital convertor 330. Convertor 330 is connected to a 4:1 parallel-to-serial convertor 345. RS232 data enters the system through an RS232 interface 335 that is connected to a latch 340. The latch 340 is connected to the 4:1 parallel-to-serial convertor 345 which combines the audio and RS232 signals and sends them to the multiplexer 390. The Ethernet signal enters the system at an Ethernet interface 350 that is connected to a physical layer structure 355 which sends a data signal and a clock signal to a first-in-first-out (FIFO) memory buffer 360 having an almost empty flag. The function of buffer 360 is to permit the build-up of 10 MHz data for transmission at 12 MHz. Buffer 360 is connected to multiplexer 390. The operation of the buffer 360 is how the bursty Ethernet data (which is very useful for network control functions) can be transferred on a single tie line with the continuous audio and video without disrupting the laminarity of the continuous signals. The T1 signal enters the system at a T1 interface 365 that is connected to a T1 transceiver 370. The transceiver 370 is connected to the multiplexer 390 through a clock multiplier 375. A timing and strobe generator 380 is connected to convertor 320, to buffer 360 and to multiplexer 390. Timing and strobe generator 380 includes a timing control block. The multiplexer 390 is electrically connected to electrical-to-optical convertor 395. Electrical-to-optical convertor 395 is optically coupled to optical fiber 398.

Figure 4:
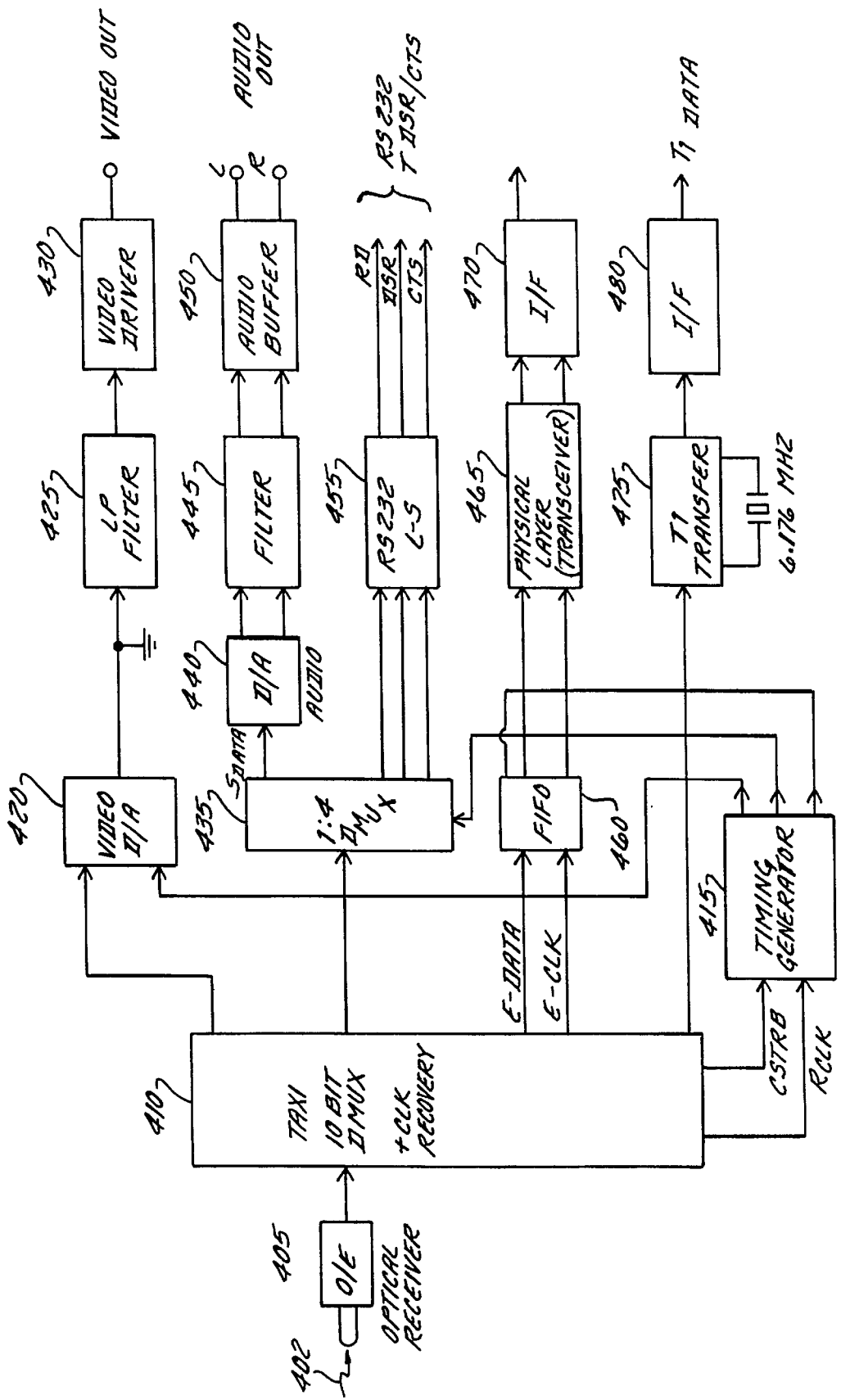
FIG. 4 illustrates a block diagram of a time division demultiplexer according to the present invention.

Referring now to FIG. 4, a time division demultiplexer system includes an Am7969 demultiplexer circuit 410 and is configured to receive continuous video, continuous audio, RS232, Ethernet and T1 data. An optical data stream from an optical fiber 402 is received by an optical-to-electronic convertor 405. Convertor 405 is electrically connected to the demultiplexer 410. The video signals from demultiplexer 410 are routed to a video digital-to-analog convertor 420. The video signal then passes to an LP filter 425 and thence to a video driver 430 for output. The audio and RS232 signals are routed to a 1:4 serial-to-parallel convertor 435. The audio signals are then routed to a digital-to-audio convertor 440, thence to a filter 445 and finally to an audio buffer 450. The RS232 signals from the convertor 435 are output through an RS232 L-S 455. The Ethernet data and clock are routed from the demultiplexer 410 to a first-in-first-out memory buffer 460 having an almost empty flag. The Ethernet output from buffer 460 is routed to a physical layer 465, which is an Ethernet transceiver with clock recover. The physical layer 465 is responsible for interfacing with the Ethernet I/F section (low pass filter and transformer) and provides NRZ Ethernet data, packet indicator status line, and clock recovery (10 MHz clock) for Ethernet packetized data. The Ethernet output is then routed to an Ethernet interface 470. The T1 data is routed from the demultiplexer 410 to a T1 transceiver 475. Transceiver 475 is connected to a T1 interface 480.

Still referring to FIG. 4, the demultiplexer 410 is connected to a timing generator 415. The timing generator 415 is connected to convertor 420, to convertor 435 and to buffer 460. Generator 415 includes a state machine that permits the recovery of the Ethernet clock without disrupting the laminarity of the continuous video and audio data.

Figure 5:
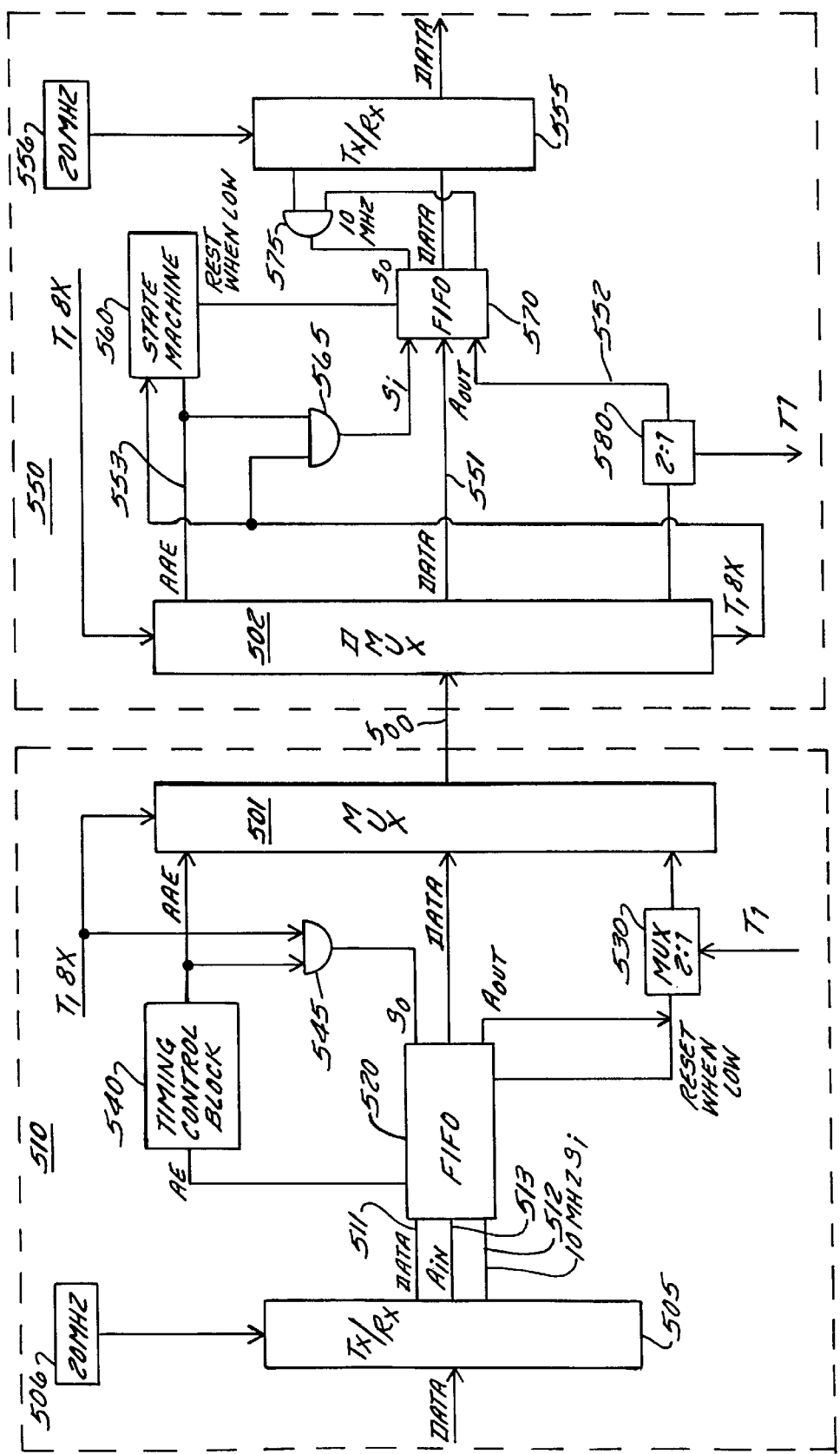
FIG. 5 illustrates a high level schematic view of a portion of a time division multiplexer-demultiplexer system according to the present invention.

Referring now to FIG. 5, the operation of the FIFO memory buffers will be described in more detail. A signal transmitting system 510 is connected to a signal receiving system 550. The signal transmitting system 510 includes an Am7968 multiplexer 501. Data to be transmitted from system 510 to system 550 is first sent to a Tx/Rx 505. A 20 MHz clock 506 is provided to Tx/Rx 505. Bursty Ethernet data, when present, is conveyed along a line 511 to a first-in-first-out memory buffer 520 having an almost empty flag AE. The almost empty flag AE is ON when the buffer 520 contains no more than 8 bits. The AE signal is sent to a timing control block 540. The timing control block 540 is connected to the multiplexer 501 and to the So terminal of buffer 520 and functions through latch 545 to slow down the AE signal so that all of the data in buffer 520 is conveyed to multiplexer 501. The timing control block 540 is illustrated in greater detail in FIG. 6, discussed below.

Still referring to FIG. 5, the corresponding Ethernet clock (10 MHz $S_i$), is conveyed along a line 512 to the buffer 520. A signal $A_{in}$ is conveyed along a line 513 to the buffer 520. Signal $A_{in}$ is ON when Ethernet data is present. The outputs of interest from the buffer 520 are the Ethernet data and a signal $A_{out}$. The Ethernet data from the buffer 520 is conveyed directly to the multiplexer 501 In this particular embodiment, the $A_{out}$ signal is multiplexed with a T1 signal with a 2:1 multiplexer 530. However, the $A_{out}$ signal could be multiplexed onto any bit where space is available and need not be multiplexed at all if open bits on the multiplexer 501 are available.

Still referring to FIG. 5, the receiving system 550 includes an Am7969 demultiplexer 502. The demultiplexer 502 is connected to multiplexer 501 with a tie line 500. Line 500 can be twisted pair, coaxial or optical fiber. The Ethernet data from the demultiplexer 502 is conveyed along a line 551 to a first-in-first-out memory buffer 570. The $A_{out}$ signal from the demultiplexer 502 is then further demultiplexed from the T1 signal by a 2:1 demultiplexer 580 and conveyed along a line 552 to buffer 570. The AAE signal (discussed below in conjunction with FIG. 6) from demultiplexer 502 is conveyed along a line 553 to a state machine 560. It is the state machine 560 that permits recovery of the Ethernet clock by the receiving system 550. State machine 560 is connected to a latch 565 and to the buffer 570. Buffer 570 is connected to a Tx/Rx 555 in part through a latch 575 which provides a 10 MHz clock. A 20 MHz clock 556 is connected to the Tx/Rx 555.

Figure 6A:
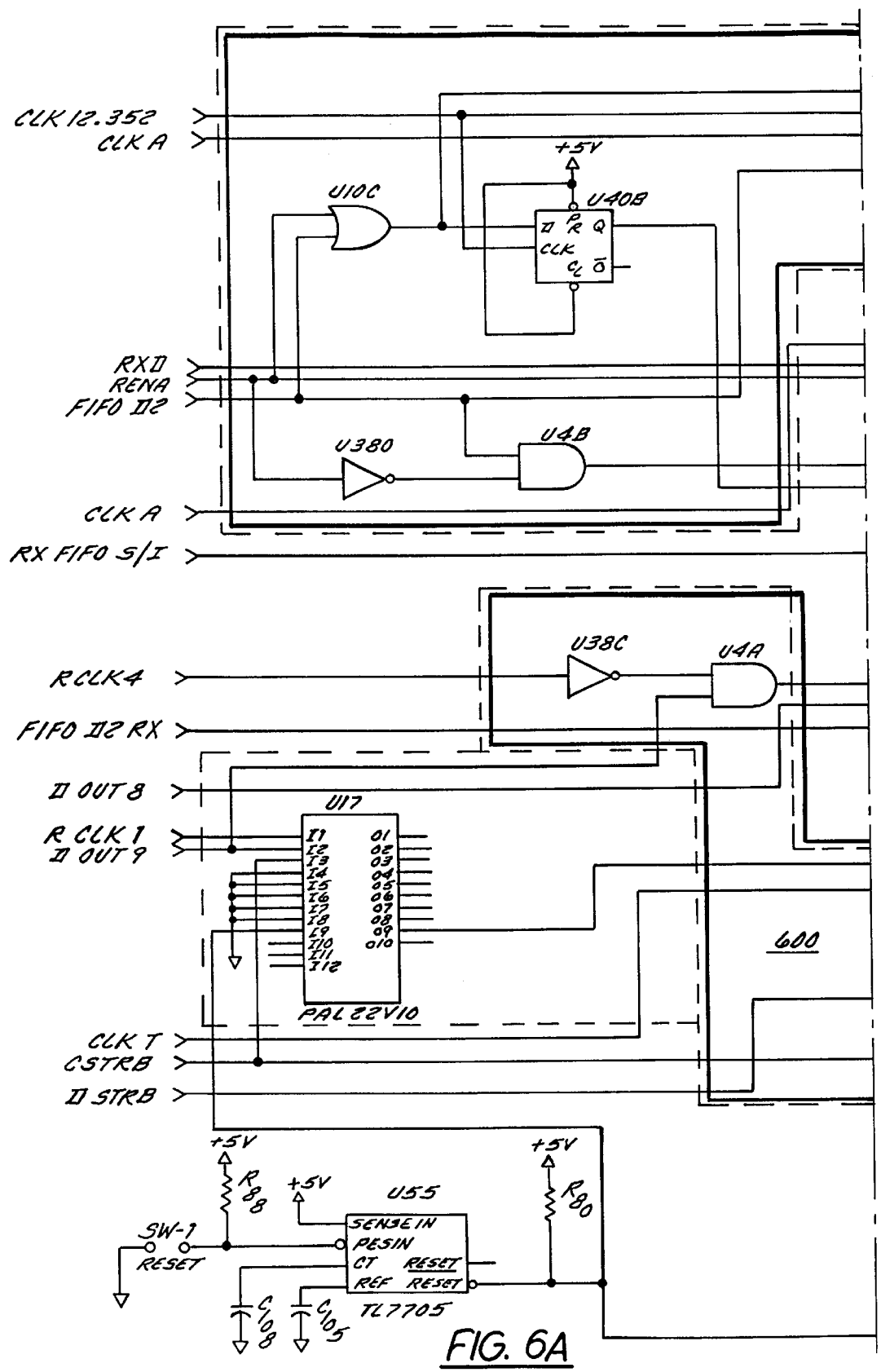
FIGS. 6A, 6B, and 6C illustrate a schematic view of a timing block according to the present invention.
Figure 6B:
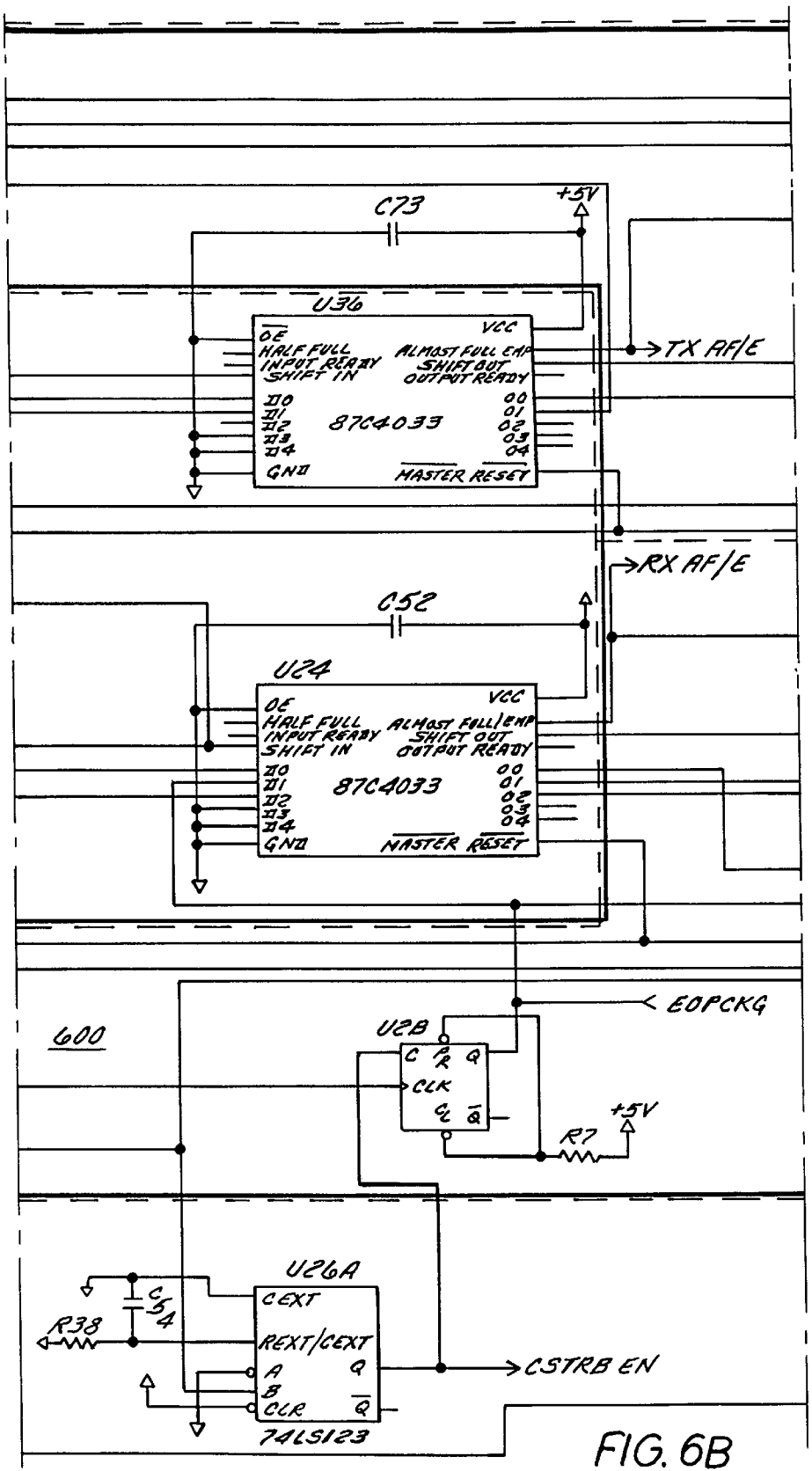
Figure 6C:
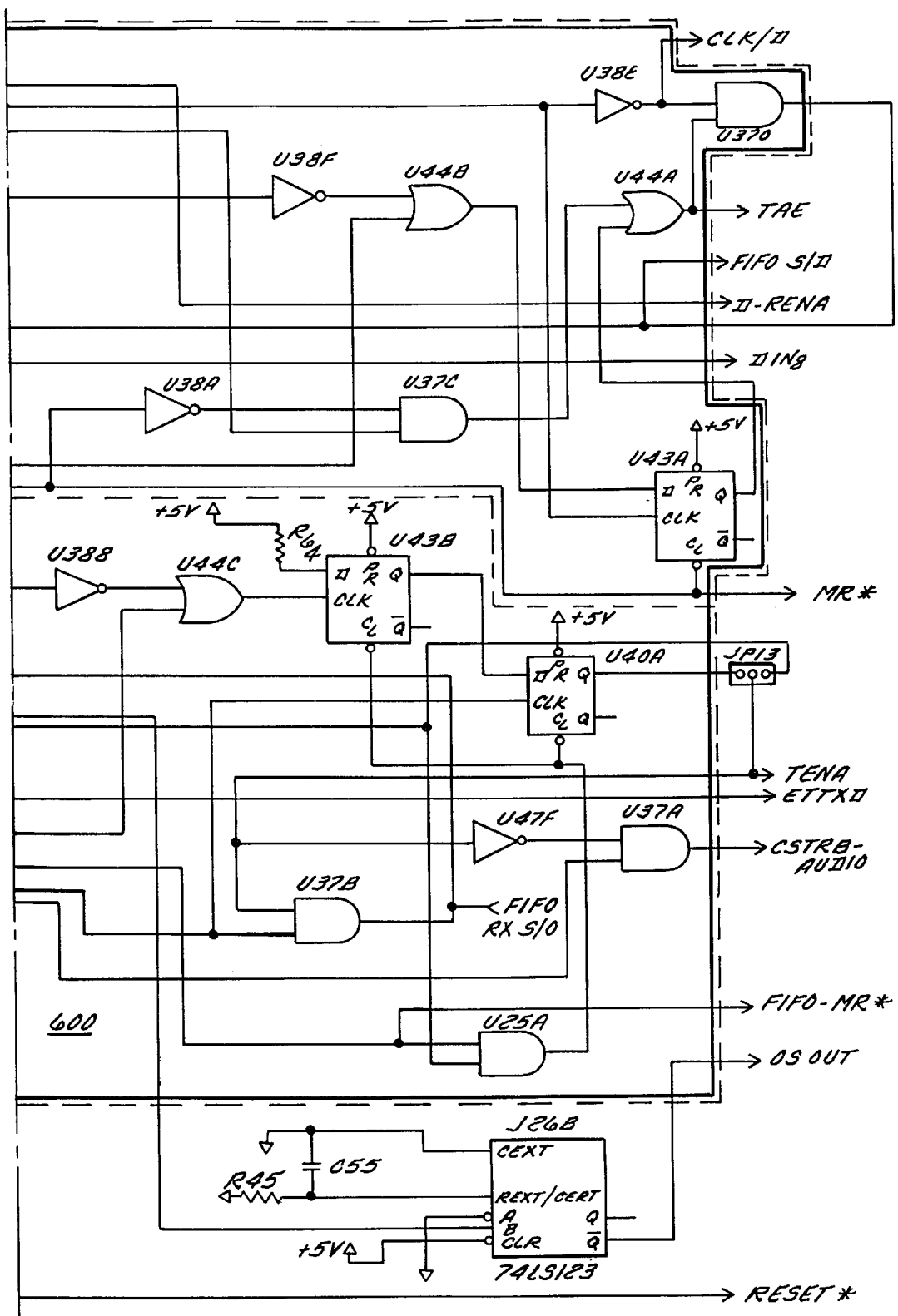

Referring now to FIGS. 6A 6B, and 6C, a timing control block 600 according to the present invention includes a number of interrelated circuits. As noted above, the timing block operates to slow down the almost empty flag from the FIFO memory buffer of the transmitting system so that all of the data from the FIFO memory buffer is conveyed to the multiplexer for transfer to the receiving system.

The timing block 600 is responsible for creating an altered almost empty flag, or AAE flag. As previously noted, the AE flag indicates that there are more than eight bits in the FIFO 520 (AE=1) or that there are less than eight bits remaining in the FIFO 520 (AE=0). The AE flag is used to match the 12 MHz clock of the multiplexer 501 with the 10 MHz clock of the Ethernet packet data. When AE=1 data is taken out of the FIFO 520, and when AE=0 no more data is taken out and the FIFO 520 is allowed to fill up with more than eight bits. The AE flag needs to be communicated to the receiver side so that a properly gated clock signal can be made available to the input of the FIFO 570 in the receiver section 550.

In order for the Ethernet data to be properly recovered in the receiver section 550, the AE signal needs to be further processed. By modifying the AE flag to an AAE flag, a state machine 710 (See FIGS. 7A–7B) can be designed to control the receiver FIFO 570. The state machine 710 can effectively identify the presence or absence of the Ethernet packet data and thus provide the FIFO reset signal and clock enable control circuit for the Ethernet transceiver section 555.

The AE flag is modified into the AAE flag as follows: When there are no packets (AE=0), the AAE flag is modified to comprise an alternating sequence of 0's and 1's. As soon as packets arrive, then the AAE flag is set equal to the AE flag. Initially, this means that the AAE flag (as well as the AE flag) will comprise a sequence of eight 0's as the initially empty FIFO 520 is being filled with packetized Ethernet data. When AAE=1, data is taken out of the FIFO 520 and is sent to the receiver 550. (The AAE and AE signals may appear as follows when packets are present: 01111100111101111101111101111 . . . and so on.) At the instant the signal $A_{in}$ becomes zero, then the AAE flag is again set equal to an alternating sequence of 0's and 1's.

FIGS. 6A, 6B and 6C illustrate in detail the circuitry used to implement the Ethernet/FIFO packet data processing and control functions as described above. All of the circuit components which are inside the heavy black box (i.e., the AND gates, the OR gates, the NOT gates, and the flip-flops, as opposed to the two 87C4033 chips, the two 74LS123 chips, the PAL22V10 chip, and the TL7705 chip) pertain to the logic required to control the transmission and reception of data in the FIFOs and the filling and emptying signalling of the FIFOs and the generation of the AAE signal. The PAL22V10 chip is used to implement a state machine 710, as now described.

Figure 7A:
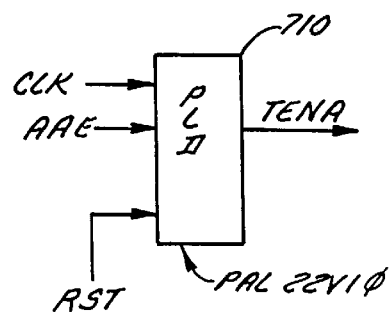
FIG. 7A illustrates a schematic view of a state machine according to the present invention.

Referring now to FIG. 7A, the state machine 710 includes inputs CLK, AAE and RST. The state machine can be the PAL 22V10 illustrated in FIG. 6 or other similar commercially available programmable chip. The output of the state machine is TENA. As noted above, the state machine permits recovery of the Ethernet clock by the receiving system.

Figure 7B:
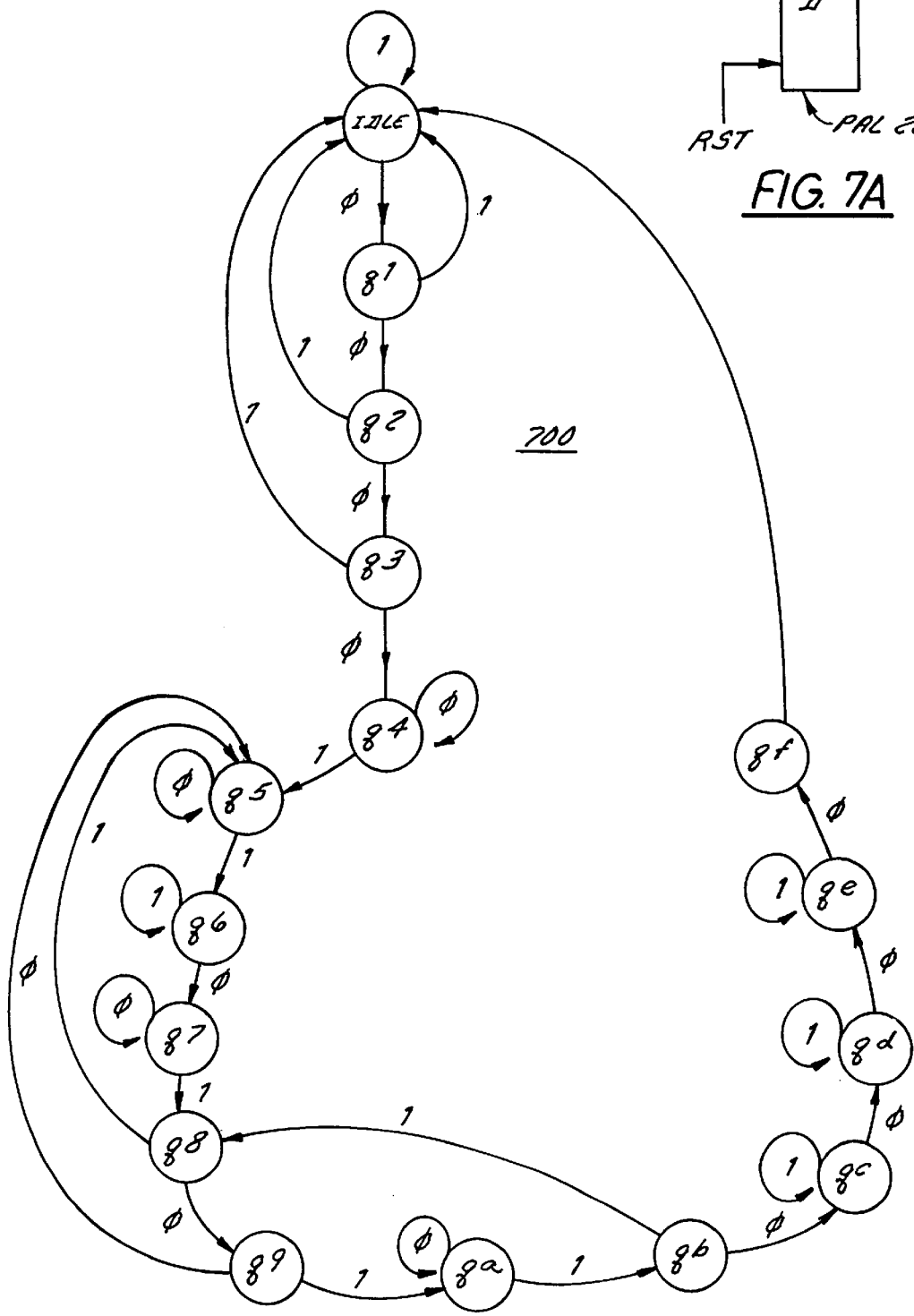
FIG. 7B illustrates a state diagram for the state machine shown in FIG. 7A.

Referring now to FIG. 7B, a state diagram for the state machine 710 after undergoing a specific programming is shown. The state diagram 700 is defined by PAL computer code which validates the AAE signal and generates a TENA signal. The validation scheme follows. If more than four consecutive 0's are detected then TENA is turned ON. Once TENA is turned ON, it is kept ON so long as $A_{in}$=1. When $A_{in}$ becomes zero (i.e., when the packet data ends), following a few "01" sequences it will turn off and reset the FIFO 570. The exact beginning and ending of the packet data is derived from $A_{in}$ which is multiplexed with T1 data on the transmit side 510 and received on the receiver side 550. This signal is passed through the FIFO as if it were data and is used to provide the presence and absence of packets $A_{out}$ indicator in the transceiver 555, which will process the packet information before passing it to the filter/transformer (Ethernet I/F) section.

The PAL computer code used to implement the state diagram 700 is given below:

```
INPUT
    1:CLK,
    2:AAE,
    9:RST,   |reset
OUTPUT
    15: TENA,
    16: AEO,
    23:Q0, 22:Q1, 21:Q2, 20:Q3
HIGH: CLK,AAE,Q[3~0],TENA,AEO
REGISTERS: Q[3~0],TENA,AEO
TYPE: "22V10"
TITLE: "FILENAME: TXIAE2.PLD"
Value: "TXIAE2"
PART: "LATTICE 'GAL22V10A-15L"
TENA = RST & ( ( TENA' & (Q[3~0] == 4)) #
                ( TENA & ! (Q[3 ~0] ==15))
            )
AEO = AAE
procedure: RST, Q[3~0]
```

-continued

```
{States: IDLE=0,q1=1,q2=2,q3=3,q4=4,q5=5,q6=6,q7=7,q8=8,q9=9,
    qa=10,qb=11,qc=12,qd=13,qe=14,qf=15
IDLE.     AEO' ?    -> q1
                    -> IDLE
q1.       AEO'?     -> q2
                    -> IDLE
q2.       AEO'?     -> q3
                    -> IDLE
q3.       AEO'?     -> q4
                    -> IDLE
q4.       AEO'?     -> q4
          AEO ?     -> q5
q5.       AEO'?     -> q5
          AEO ?     -> q6
q6.       AEO'?     -> q7
          AEO ?     -> q6
q7.       AEO'?     -> q7
          AEO ?     -> q8
q8.       AEO'?     -> q9
          AEO ?     -> q5
q9.       AEO'?     -> q5
          AEO ?     -> qa
qa.       AEO'?     -> qa
          AEO ?     -> qb
qb.       AEO'?     -> qc
          AEO ?     -> q8
qc.       AEO'?     -> qd
          AEO ?     -> qc
qd.       AEO'?     -> qe
          AEO ?     -> qd
qe.       AEO'?     -> qf
          AEO ?     -> qe
qf.                 -> IDLE
}
VECTORS:
{ D (RST,CLK)c,AAE, "=> ",AEO,(Q[3⁻0])d,(TENA)c
  T RST=1; CLK=0,1
  C RST,AAE
  T AAE=0; CLK=2(0,1)
  T AAE=1; CLK=1(0,1)
  T AAE=0; CLK=3(0,1)
  T AAE=1; CLK=1(0,1)
| RENA TURNS ON
  T AAE=0; CLK=8(0,1)
  T AAE=1; CLK=3(0,1)
  T AAE=0; CLK=1(0,1)
  T AAE=1; CLK=4(0,1)
  T AAE=0; CLK=1(0,1)
  T AAE=1; CLK=5(0,1)
  T AAE=0; CLK=1(0,1)
  T AAE=1; CLK=3(0,1)
  T AAE=0; CLK=2(0,1)
  T AAE=1; CLK=1(0,1)
  T AAE=0; CLK=1(0,1)
  T AAE=1; CLK=1(0,l)
  T AAE=0; CLK=1(0,1)
  T AAE=1; CLK=1(0,1)
  T AAE=0; CLK=1(0,1)
  T AAE=1; CLK=1(0,1)
  T AAE=0; CLK=1(0,1)
  T AAE=1; CLK=2(0,1)
  T AAE=0; CLK=1(0,1)
  T AAE=1; CLK=1(0,1)
  T AAE=0; CLK=3(0,1)
END}
```

It should therefore be apparent that the state machine 710 illustrated in FIG. 7A whose state diagram is illustrated in FIG. 7B is a sequence detector. The output of the state machine 710 (TENA) is turned on (TENA=1) if a minimum of four consecutive 0's are detected, and remains on so long as there is packet data. When the packet data ends, it will be on for a few additional clock cycles.

Figure 8A:
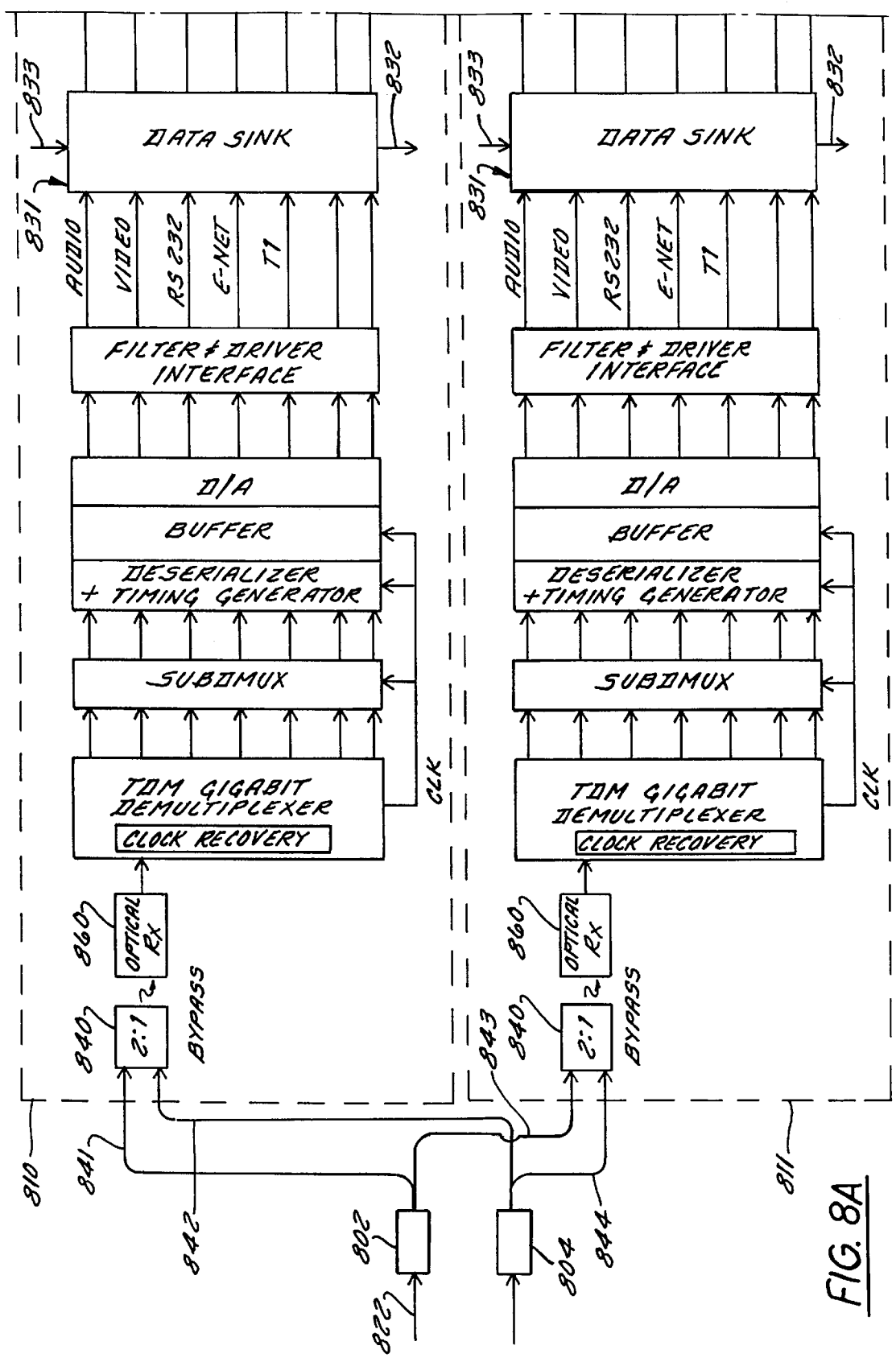
FIGS. 8A and 8B illustrate a high level block diagram of a time division multiplexer-demultiplexer system with a drop-add switch, a 2:1 bypass switch and wavelength division multiplexing according to the present invention.
Figure 8B:
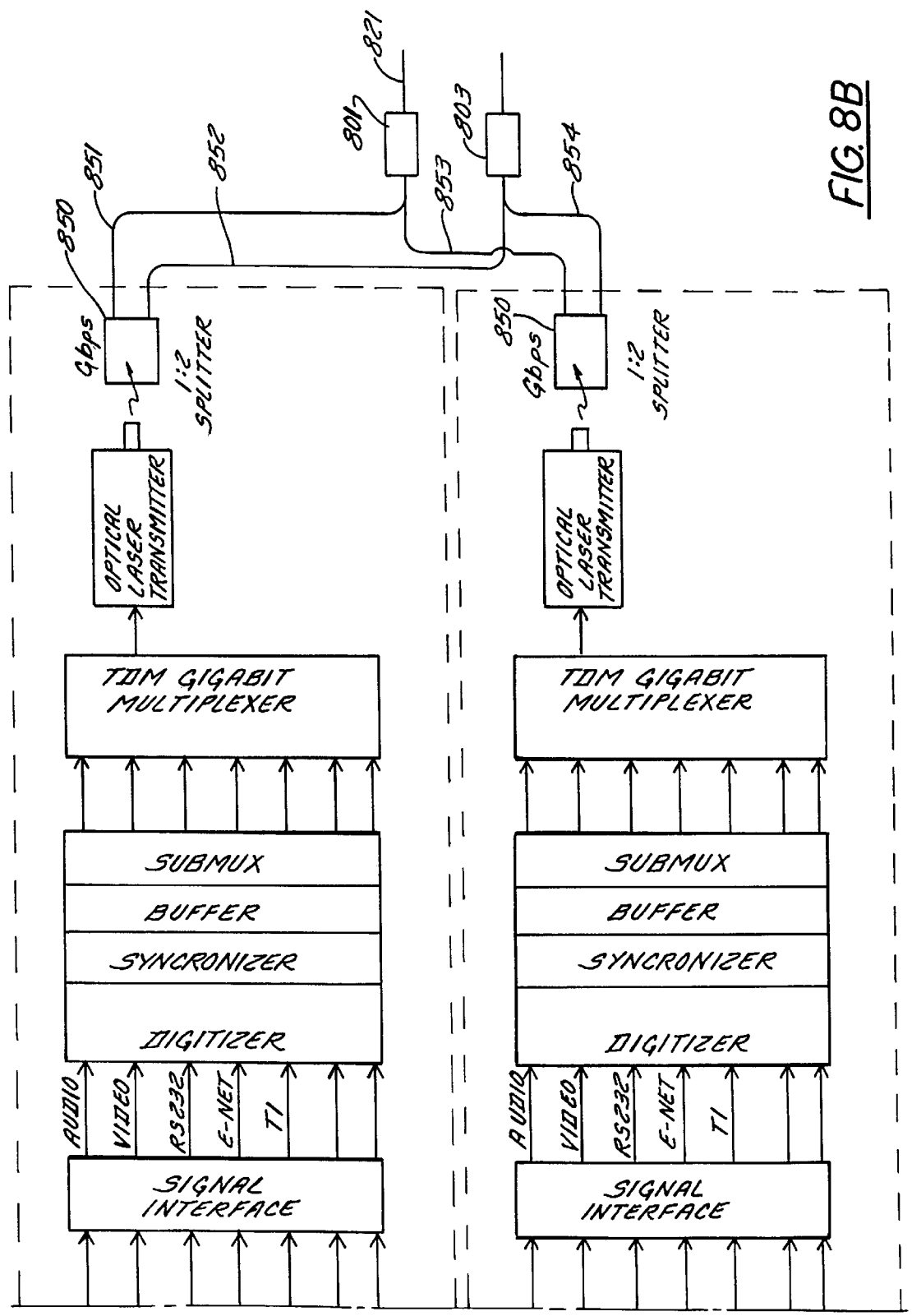

Referring now to FIGS. 8A and 8B, three different optional features of the invention will be described in a single embodiment. Please carefully note that FIG. 8 shows two parallel systems 810 and 811. Note that each of the systems is provided with a drop/add switch 831. Note also that, each of the systems functions with redundant tie lines through 2:1 bypass switches 840 and 1:2 splitters 850. Finally, the two systems are connected together with wavelength division multiplexers 801 and 803 and wavelength division demultiplexers 802 and 804. Thus, the three optional features are combined in one embodiment.

Still referring to FIGS. 8A and 8B, to reiterate, the apparatus that implements the three optional features includes 1) drop/add switches 831; 2) 2:1 bypass switches 840 and 1:2 splitters 850 and 3) wavelength division multiplexers 801 and 803 and wavelength division demultiplexers 802 and 804. The functions provided by these three optional features are 1) drop-add switching for networkability; 2) 2:1 bypass switching for tie line redundancy; and 3) wavelength division multiplexing of parallel mux/demux systems for increased throughput (bandwidth). It should be noted that these three optional features are completely independent, and do not require the presence of one another, but are disclosed as part of a single embodiment for the sake of brevity and to emphasize that these optional features can cooperate together in providing a high capacity, robust and flexible network.

Still referring to FIGS. 8A and 8B, the drop-add switching feature will now be described. A first mux/demux system 810 can include a drop-add switch 831. The presence of drop-add switch 831 permits any combination of demultiplexed signals to be dropped to a user (not shown) through a drop line 832. In addition, the drop-add switch permits signals to be added through an add line 833, if unused bits on the bus are available. Although lines 832 and 833 are depicted as single lines, they can be any number of twisted pairs, coaxial cables or optical fibers. Together, lines 832 and 833 can compose a full duplex loop that connects the user to a network though the system 810. The function of the drop-add switch 831 can be provided by off-the-shelf routing switchers, such as, for example, cross-bar switches, that are readily commercially available.

Still referring to FIGS. 8A and 8B, the 2:1 bypass switching feature will now be described. The system 810 includes a 2:1 bypass switch 840. The 2:1 bypass switch 840 is optically connected to a first fiber 841 and a second fiber 842. If fiber 841 is designated as the primary fiber, then switch 840 will convey the signal carried by fiber 841 to opticalelectrical converter 860. If fiber 841 is cut, or otherwise falls silent, switch 840 will actuate and thereafter couple fiber 842 to converter 860. Assuming that fibers 841 and 842 are carrying the same (broadcast) signal, receiving redundancy is thereby provided. System 810 also includes a 1:2 splitter 850 that is optically connected to optical fibers 851 and 852. Splitter 850 always functions in broadcast mode and fibers 851 and 852 both carry the same signal. Together, switch 840 and splitter 850 provide full duplex redundancy. In more detail, the 2:1 bypass switch 840 can be an emitter coupled logic multiplexer chip. This chip senses the lack of optical energy from a main receive line (e.g., fiber 841) and quickly switches the optical input to a standby receive line (e.g., fiber 842) using a programmable sensing interval of from approximately 1 nsec to approximately 10 nsec, a programmable time between sensings of from approximately 100 msec to approximately 1 minute and a programmable maximum tolerated silent time of from approximately 2 seconds to approximately 60 seconds. Suitable generic emitter coupled logic multiplexer chips are readily commercially available from Motorola, National Semiconductor and Phillips. The switching speeds that can be achieved using such off-the-shelf components is on the order of nanoseconds.

Still referring to FIGS. 8A and 8B, the wavelength division multiplexing (WDM) feature will now be described. It will be appreciated that the first mux/demux system 810 and a second mux/demux system 811 are combined in parallel. Systems 810 and 811 operate at different frequencies. (Because both of systems 810 and 811 include tie line redundancy, the explanation of the WDM feature will be somewhat more involved than otherwise necessary.) Two wavelength division multiplexers 801 and 803 are each connected to both of the 1:2 splitters 850. The output signal from system 810 is carried by fibers 851 and 852. The output signal from system 811 is carried by fibers 853 and 854. Multiplexer 801 is fed by fibers 851 and 853. At the same time, multiplexer 803 is fed by fibers 852 and 854. In this way, the output signal from system 810 is multiplexed with the output signal from system 811, while tie line redundancy is maintained at the transmitting end. At the receiving end, two wavelength division demultiplexers 802 and 804 are each connected to both of the 2:1 bypass switches 840. The input signal to system 810 is carried by fibers 841 and 842. The input signal to system 811 is carried by fibers 843 and 844. Demultiplexer 802 feeds an input signal to system 810 via fiber 841 and to system 811 via fiber 843. At the same time, demultiplexer 804 feeds an input signal to system 811 via fiber 844. In this way, the correct input signals are fed to the correct systems, while tie line redundancy is maintained at the receiving end. Although almost any commercially available wavelength division multiplexer-demultiplexers can be used to multiply the data transfer capacity of the invention, a specific example that enables multiplexing and/or demultiplexing in the 1310 nm and 1550 nm regions are the dual-window IPITEX WDMs which are readily commercially available from IPITEK of Carlsbad, Calif.

Figure 9:
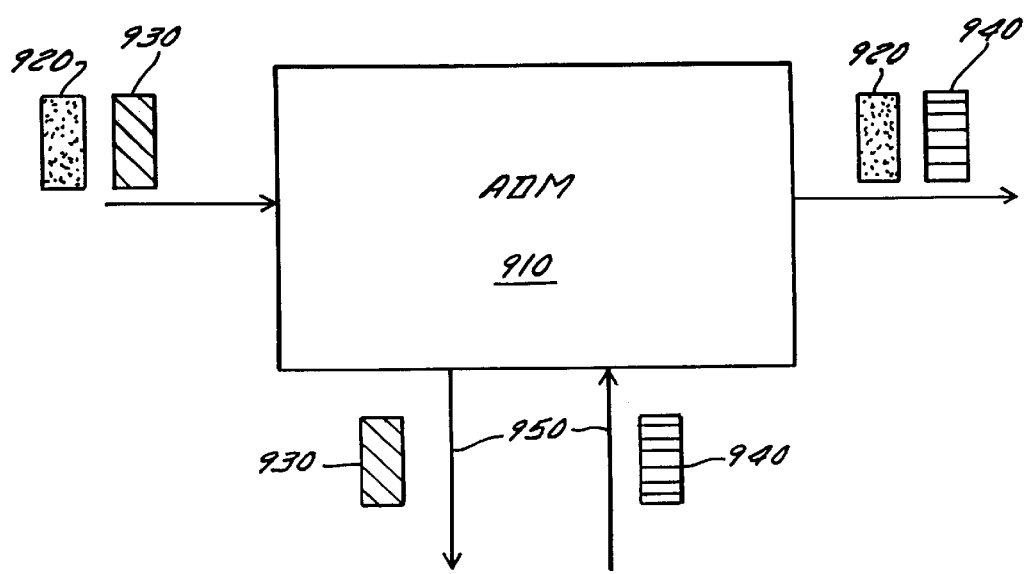
FIG. 9 illustrates a schematic block diagram of a time division multiplexer-demultiplexer system with a drop-add switch according to the present invention.

Referring now to FIG. 9, a generic add/drop multiplexer-demultiplexer 910 (ADM) is shown. The ADM 910 is a generic representation of one of systems 810 and 811 of FIGS. 8A–8B having drop-add switch 831. Referring again to FIG. 9, the ADM 910 is shown passing a first set of data 920 while dropping a second set of data 930 to a user (not shown) and adding a third set of data 940 from the user. In this way, the add/drop multiplexer 910 can replace one of the incoming streams with another. The second set of data 930 can be dropped, and the third set of data 940 can be added via a full duplex dedicated router interconnect 950. Thus, the "user" can be a network that includes a router. The interconnect 950 is connected both to a signal transmitting system and to a signal receiving subsystem of the add/drop multiplexer 910. The full duplex dedicated router interconnect can be a single full duplex wave division multiplexer optical fiber or a pair of simplex optical fibers. More generically, the second set of data 930 and the third set of data 940 can be exchanged over a connection that is equivalent to lines 832 and 833 of FIG. 8.

Figure 10:
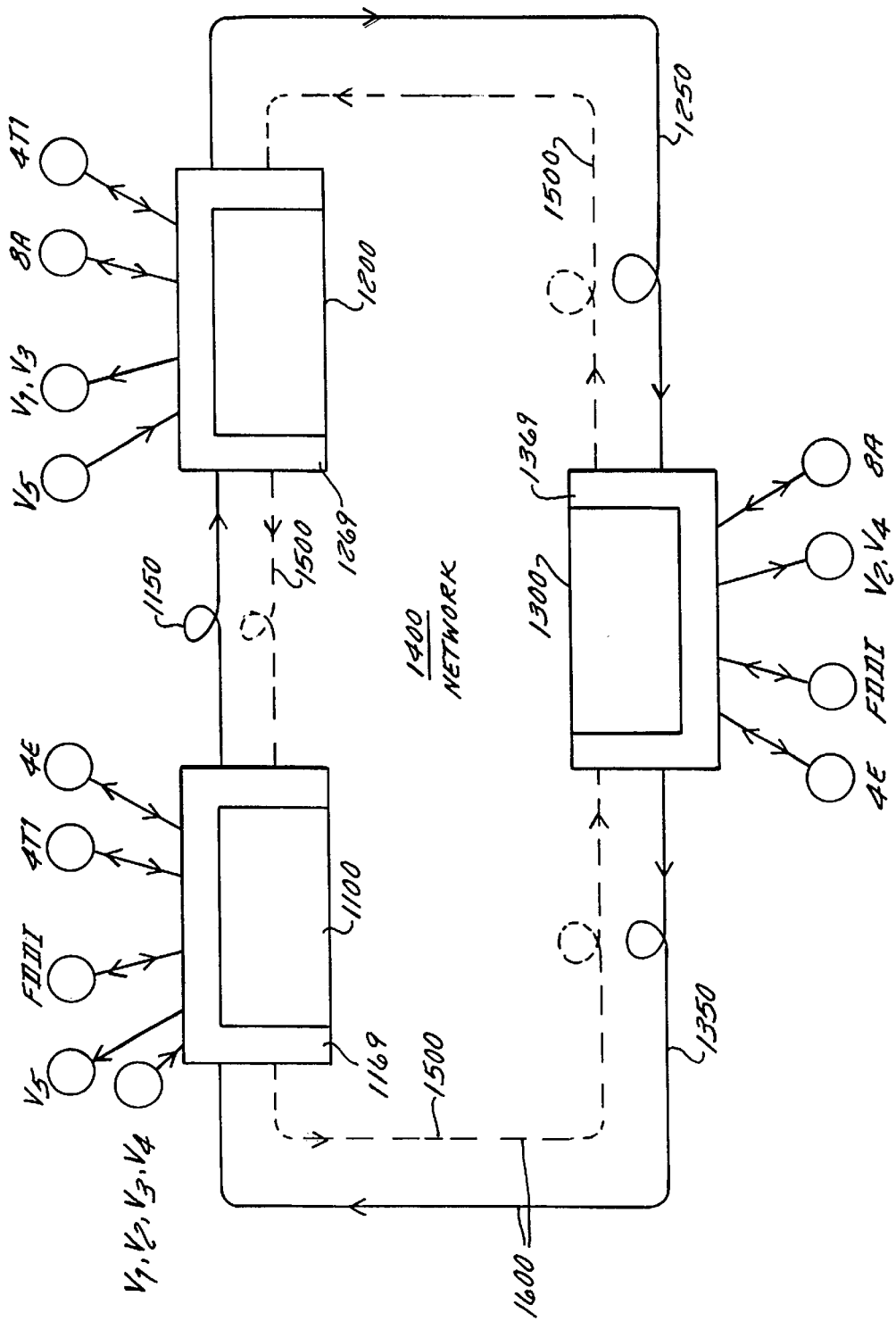
FIG. 10 illustrates a schematic block diagram of a network formed with a plurality of time division multiplexer-demultiplexer systems all of which have drop-add switches according to the present invention.

Referring now to FIG. 10, the networkability that is enabled by the ADM concept will be appreciated. FIG. 10 shows a ring network 1400 formed through the interconnection of three of the ADMs 910 of FIG. 9. A first ADM 1100 is connected to a second ADM 1200 with a first tie line 1150. The second ADM 1200 is connected to a third ADM 1300 with a second tie line 1250. The third ADM 1300 is connected to the first ADM 1100 with a third tie line 1350, thereby forming the ring network 1400. A second set of tie lines 1500 is shown with a dashed line. In this way, a full duplex ring 1600 is formed.

Still referring to FIG. 10, a first network access port 1169 for simultaneous I) full duplex messaging between a first user and a second user and II) management of the network 1400 including dynamic reallocation of network resources is a user accessible feature of the first ADM 100. Dynamic reallocation of network resources enables time division multiplexing-demultiplexing of continuous and (bursty and/or packetized data) so as to permit in-band/out-of-band control of one or more router switchers. In more detail, the control data may be considered to be in-band while is multiplexed with the continuous data. Once demultiplexed, the control data may be considered to be out of band and, of course, can be directed to the router switches and used to reallocate system resources, for example, to reconfigure the router switchers.

Still referring to FIG. 10, it is expected that Ethernet will be a commonly chosen subport medium for this purpose since many router switches and other networking hardware are controllable with the Ethernet protocol. In the depicted configuration, the first ADM 1100 is adding four video signals V1, V2, V3 and V4 while simultaneously dropping a single video signal V5. The first ADM 1100 is simultaneously transferring duplex data in the form of an FDDI signal, four T1 signals and 4 Ethernet signals. It will be appreciated that such an information intensive user may be a subnetwork, which may, or may not, include one or more router switchers. The second ADM 1200 and the third ADM 1300 are provided with a second network access port 1269 and a third network access port 1369, respectively. Any of the network access ports can include, or be reconfigured to include, one or more of an RS232 subport with a full hand shake interface, an RS422 subport, an RS485 subport, a SCSI subport and a full duplex 10 Mb/sec packetized data subport. The full hand shake interface for the RS232 subport allows various control signals, i.e., DTR (data terminal ready), DSR (data set ready), RTS (ready to send) and CTS (clear to send), to be traitted across the RS232 interface. Of course, the network access ports can also include other structure for asynchronous data communication or packetized data communication.

Figure 11:
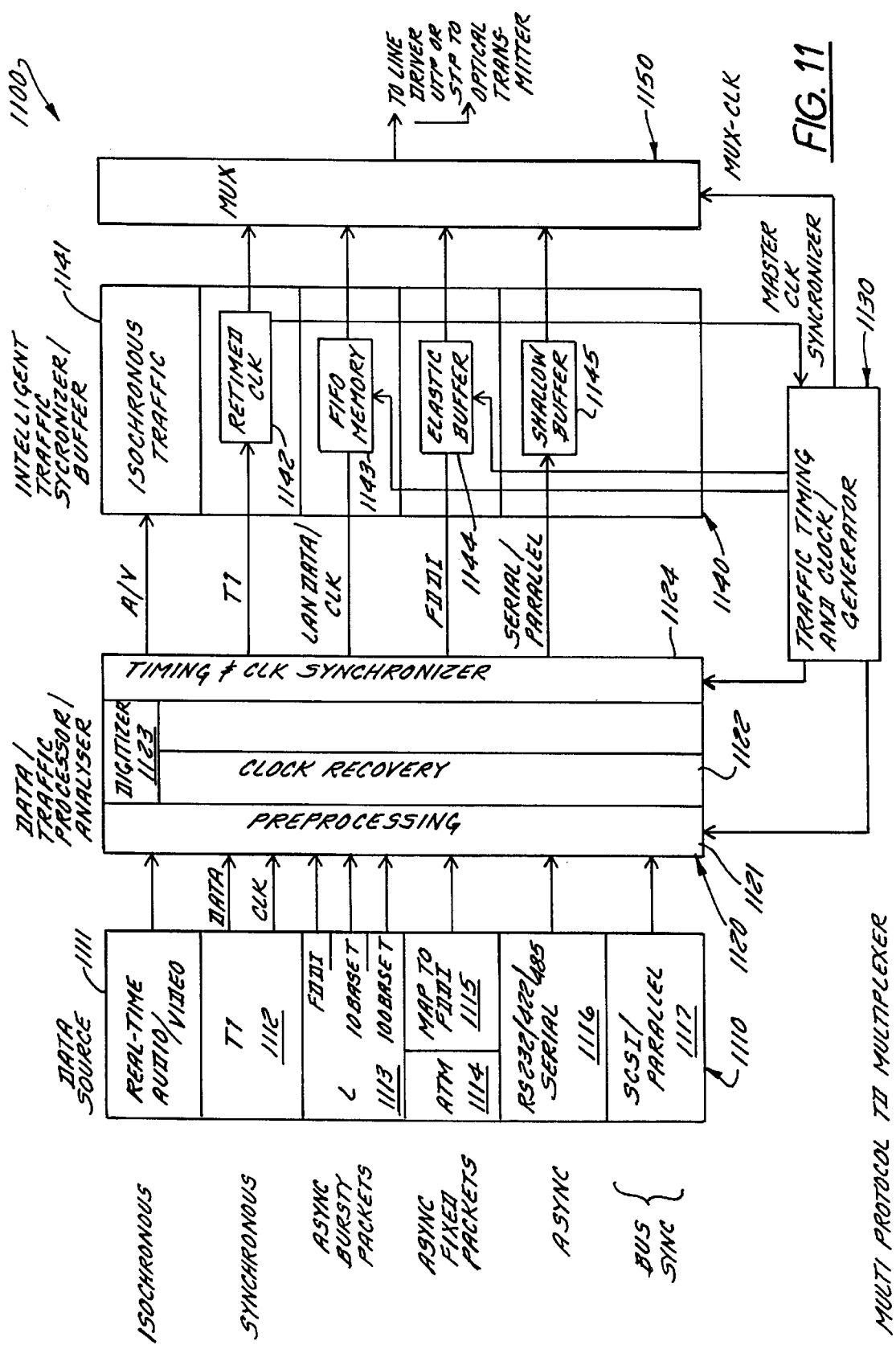
FIG. 11 illustrates a block diagram of another time division multiplexer according to the present invention.
Figure 12:
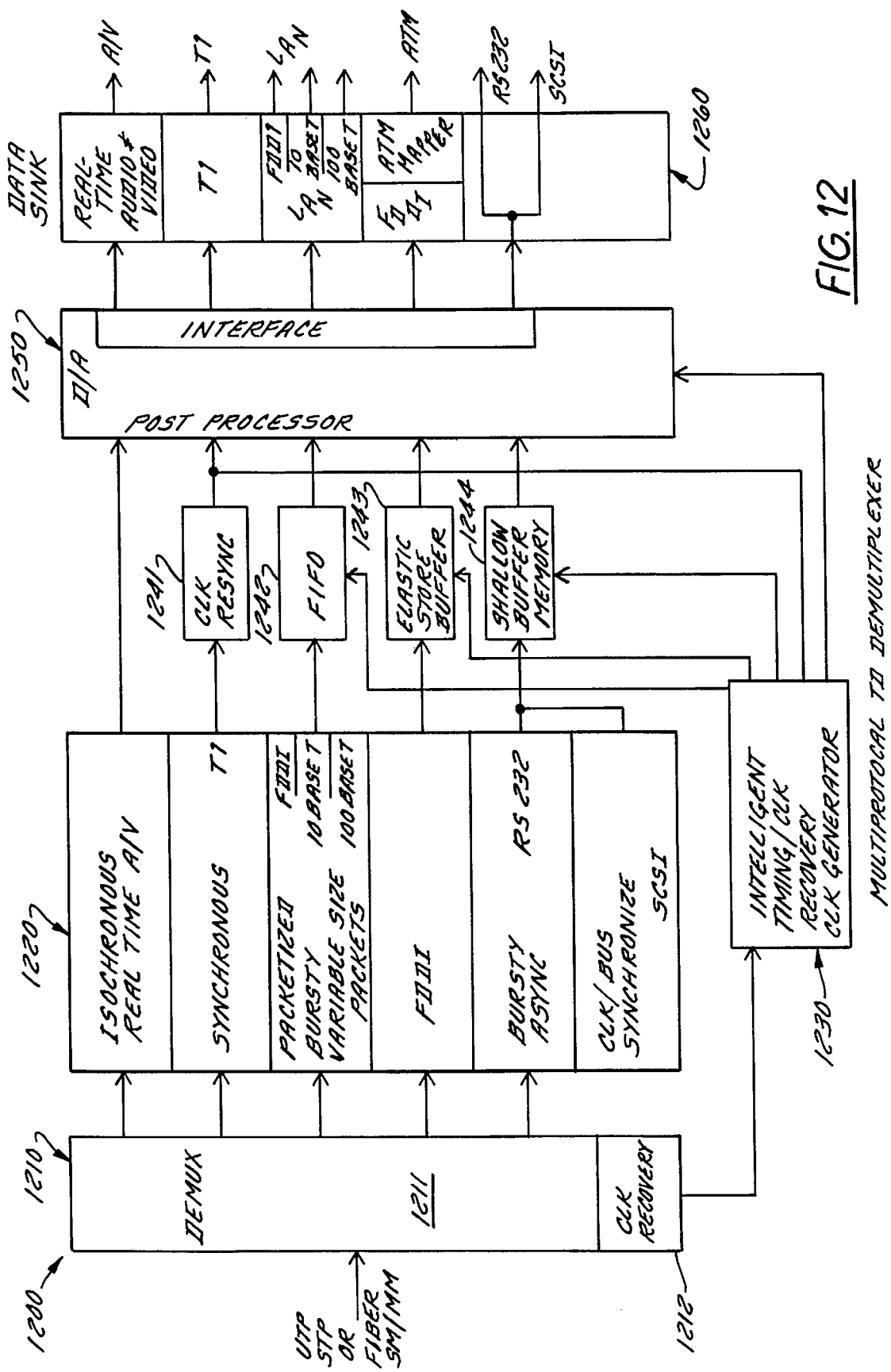
FIG. 12 illustrates a block diagram of another time division demultiplexer according to the present invention.

Referring now to FIGS. 11–12, alternative embodiments of a time division multiplexer and a time division demultiplexer according to the present invention are illustrated.

Referring first to FIG. 11, the time division multiplexer 1100 comprises a data source block 1110, a data/traffic processor/analyzer block 1120, a traffic timing and clock output generator block 1130, a traffic synchronizer/buffer block 1140, and a multiplexer block 1150. The data source block 1110 generates (or receives) a plurality of different types of data.

The following data types are illustrative of the data types which could be handled by the multiplexer 1100 and the demultiplexer 1200.

First, the data source block 1110 generates real time audio and/or video data. This data originates as continuous analog data. However, this data is digitized and multiplexed, it becomes isochronous in format.

Second, the data source block 1110 generates a synchronous signal at block 1112. In the illustrated example the synchronous data is T1 data, which is a standard telephony signal with very stringent specific frequency and timing tolerances/requirements. The fact that the T1 signal has the most stringent frequency and timing requirements results in the T1 data clock being used as the master clock for the demultiplexer 1200, as described below.

Third, the data source block 1110 generates several different types of asynchronous data at a block 1113. The asynchronous data can include, for example, FDDI data, 10 Base T data and 100 Base T. The block 1113 could also generate other types of data which are asynchronous and which tend to be generated in the form of bursty packets. Also the different types of data which are generated at the block 1113 can have different clocking schemes (as is the case with FDDI data, 10 Base T Ethernet data and 100 Base T Ethernet data).

Fourth the data source block 1110 generates asynchronous data having fixed packet sizes, for example asynchronous transfer mode (ATM) data at block 1114. The ATM data packets are converted to FDDI data packets at block 1115.

Fifth, the data source block 1110 generates asynchronous data at block 1116. As illustrated, this data can be in the form of RS232, RS422, and RS485 serial data, or other types of asynchronous data which are generated by a computer. These data types are serial in nature and can have different bit rates and different protocols.

Finally, the data source 1110 generates parallel data having a clock which must be synchronized to a bus. For example, the data could be of the small computer system interface (SCSI) format, which is a standard interface throughout the computer industry used for handling memory transfers in conjunction with a parallel interface. The SCSI data must be synchronized to the bus for the interface used by the microprocessor of the computer.

The different data types generated by the data source 1110 are then processed and analyzed in the data/traffic processor/analyzer block 1120. Specifically, the block 1120 includes a pre-processing block 1121, a clock recovery block 1122, a digitizer block 1123, and a timing and clock synchronizer block 1124.

The pre-processing block 1121 filters the incoming data. With respect to the real time audio/video data, it is also necessary to use a digitizing block 1123 to digitize the data, since this data is originally in analog format.

With respect to all data types, clocking information is not provided by a separate clock signal but is rather embedded in the data. Therefore, it is necessary to run the different data types through the clock recovery block 1122 in order to extract the clocking information. This clocking information is necessary in order to synchronize the data traffic as performed by the traffic synchronizer/buffer block 1140.

The data/traffic processor/analyzer block also performs a multiplexing function. Thus, the number of data outputs from the data/traffic processor/analyzer block 1120 is reduced as compared to the number of data inputs to the data/traffic processor/analyzer block 1120.

The different data streams exiting the data/traffic processor/analyzer block 1120 have different data clocks. This clocking information is extracted by the processor block 1120, however, it is still necessary to re-synchronize and re-time this data so that their clocks are aligned with the clock of the multiplexer 1150. Notably, the re-timing is performed based on the clock of the T1 data, and thus the clock information from the T1 data stream is input into a traffic timing and clock control generator block 1130. The T1 data clock is therefore the master clock used to synchronize the different data streams. The T1 data clock is used as the master clock because the frequency and timing requirements of the T1 data are the most stringent.

The data streams are then fed to the multiplexer 1150. The multiplexer 1150 serializes the data, and encodes it using the 10B/12B encoding format as described above. The output of the multiplexer may be fed to an optical transmitter coupled to an optical fiber, coaxial cable, or a twisted pair cable, or other communication medium.

Referring now to FIG. 12, FIG. 12 illustrates a time division demultiplexer 1200 which is used in conjunction with the time division multiplexer 1100 illustrated in FIG. 11. The time division demultiplexer 1200 comprises a demultiplexer block 1210, a traffic desynchronizer block 1220, a post processor block 1250 and a data sync block 1260.

Functionally speaking, the time division demultiplexer 1200 is the mirror image of the time division multiplexer 1100. Thus, for whatever "processing" is done with respect to the individual data streams by the time division multiplexer 1100, there is a corresponding "deprocessing" performed by the time division demultiplexer 1200. For this reason, the discussion of the time division demultiplexer 1200 illustrated in FIG. 12 is less detailed than the discussion of the time division multiplexer 1100 illustrated in FIG. 11.

The demultiplexer 1210 receives the data streams transmitted over the communication medium from the multiplexer 1150. The demultiplexer 1210 deserializes the data and decodes from the 10B/12B encoding format. The deserialized data streams are then fed to the traffic desynchronizer block 1220 which restores the original timing of the data streams. This is done in conjunction with a clock recovery circuit 1212 which is coupled to an intelligent timing/clock recovery clock generator circuit 1230. Again, the clock generator circuit 1230 receives an input from the clock resynchronization circuit 1241, which is coupled to the T1 data stream.

The post processor block performs a further demultiplexing function. This demultiplexing function corresponds to the multiplexing function performed by the data/traffic processor/analyzer block 1120. The post processor block 1250 also performs digital to analog conversion for the real time audio/visual signal generated at the block 1111. The data streams from the post processor 1250 are then fed to the data sync 1260, where they are then ready for use.

Notably, a plurality of different types of memories are used for traffic synchronization/desynchronization. Thus, a FIFO 1242, an elastic store buffer 1243, and a shallow buffer are used in the illustrated embodiment of the multiplexer 1100.

The elastic buffer 1144 handles FDDI data, and is a very high speed memory which operates at 125 MHz (as compared to 10-12 MHz for the memory handling the 10 Base T data). The shallow buffer is used for bursty asynchronous data and is characterized in that data can be taken out in a different sequence than it is put in (unlike the FIFO memory buffer 1143).

A significant aspect of the time division multiplexer 1100 and demultiplexer 1200 is that store and forward operations are not utilized. Rather, the data is processed on the fly in real time. (The only reason for using memories such as the FIFO memory 1143, the elastic buffer 1144 and the shallow buffer 1145 is to match the different data rates that are used, e.g., the 10 bit data rate coming into the FIFO 1143 with the 12 bit data rate coming out of the FIFO memory 1143. These memories are not used for store and forward operations.

Using store and forward operations is disadvantageous because it increases the latency of the time division multiplexer 1100, and thereby precludes the transmission of the continuous data in laminar fashion. Further, latencies are disadvantageous because they can prevent two sides of a communication link from talking to each other (i.e., the communication link can "time out"). This is because one side of the communication link may expect to see an echo within a certain period of time, but when such an echo is not detected, the communication system times out.

Additionally, latencies are disadvantageous because when a bursty data file is transmitted in conjunction with continuous video data, motion artifacts start showing up in the video as a result of the high traffic data. Further, the video and the audio might lose synchronization with respect to each other. Thus, the present invention is highly advantageous because it is latency free with respect to all of the data streams which are transmitted.

The lack of latencies is achieved by the functional location of the memory buffers 1142–1145 just prior to the multiplexer 1150. Further, there are a plurality of data streams (of different protocols) which are transmitted in a latency free manner because of the plurality of buffers 1142–1145 in conjunction with the multiplexer 1150.

Advantageously, therefore, the present invention can be used in conjunction with a plurality of different types of protocols, and can transmit all of them in laminar fashion. FIGS. 13A and 13B illustrates some of the different protocols with which a multiplexer/demultiplexer combination of the present invention can be used, and characteristics of the different protocols.

The Ethernet control signals and continuous multi-media (i.e., at least audio and video) data can be combined on a single bit stream. Further, all the disclosed embodiments of the present invention are useful in conjunction with the transfer of continuous data such as are used for the purpose of providing real-time video, or for the purpose of providing real-time audio, or the like. There are virtually innumerable uses for the present invention described herein, all of which need not be detailed here.

A time division multiplexer-demultiplexer according to the present invention is cost effective and advantageous for at least the following reasons. Where continuous data is to be transferred together with bursty and/or packetized data, fewer tie lines can now be used between a given number of users. The design of networks is now simplified, particularly where the specific type of data to be transferred between particular users is not known in advance, or might change on a moment to moment basis. The reconfiguration of networks is now simplified. Specifically, dedicated control channels need no longer be assigned. Similarly, dedicated continuous data channels need no longer be assigned. All channels can be considered by the network to be interchangeable in determining the optimum configuration at any moment. Further, the invention empowers individual users to send control data, even while they simultaneously transmit continuous data, thereby reconfiguring the network themselves.

Although the best mode contemplated by the inventor of carrying out the present invention is disclosed above, practice of the present invention is not limited thereto. It will be manifest that various additions, modifications and rearrangements of the features of the present invention may be made without deviating from the spirit and scope of the underlying inventive concept. Accordingly, it will be appreciated by those skilled in the art that, within the scope of the appended claims, the invention may be practiced otherwise than as specifically described herein.

For example, although the mux-demux of one bit stream of bursty data has been described in more detail for the sake of simplicity, the mux-demux of any combination of continuous, bursty and packetized data can be performed in accordance with the invention. In addition, the individual subsystems need not be fabricated from the disclosed components, but could be fabricated from virtually any suitable components.

Moreover, the individual components need not attached in the disclosed forms, or assembled in the disclosed configuration, but could be provided in virtually any form, and assembled in virtually any configuration, which cooperate so as to provide simultaneous transfer of continuous data with bursty data and/or packetized data on the same tie line without disruption of the laminarity of the continuous data. Further, although both the time division multiplexer and time division demultiplexer are described herein as physically separate modules, it will be manifest that either, or both of, the time division multiplexer and the time division demultiplexer may be integrated into the apparatus with which they are associated. Furthermore, all the disclosed features of each disclosed embodiment can be combined with, or substituted for, the disclosed features of every other disclosed embodiment except where such features are mutually exclusive.

It is intended that the appended claims cover all such additions, modifications and rearrangements. Expedient embodiments of the present invention are differentiated by the appended subclaims.

What is claimed is:

1. An add/drop multiplexer, comprising:
   (A) a signal transmitting system for simultaneous transmittal, on a first single tie line, of latency free continuous data and at least one member selected from the group consisting of bursty data and packetized data, said signal transmitting system including (1) a time division multiplexer, (2) an analog-to-digital convertor for simultaneous transmittal of base band latency free continuous real time audio and video data connected to said time division multiplexer, (3) a timing control block connected to said time division multiplexer, (4) a first FIFO memory buffer connected to both said time division multiplexer and said timing control block and (5) a clock multiplier connected to said multiplexer;
   (B) a signal receiving system for simultaneous reception, on a second tie line, of latency free continuous data and at least one member selected from the group consisting of bursty data and packetized data, said signal receiving system including (1) a time division demultiplexer, (2) a digital-to-analog convertor for simultaneous reception of base band latency free continuous real time audio and video data connected to said time division demultiplexer, (3) a state machine connected to said demultiplexer, and (4) a second FIFO memory buffer connected to both said demultiplexer and said state machine;
   (C) a switch for dropping and adding signals connected to both said multiplexer and said demultiplexer; and
   (D) a network access port for simultaneous (1) full duplex messaging between a first user and a second user and (2) management of a network including dynamic reallocation of network resources, said network access port being connected to said switch for dropping and adding signals, wherein said network access port includes at least one subport selected from the group consisting of an RS232 subport with a full hand shake interface, an RS422 subport, an RS485 subport, a SCSI subport and a full duplex 10 Mb/sec packetized data subport.

2. A system, comprising:
   (A) a signal transmitting system for transmitted of a serialized signal including (1) latency free non compressed continuous data and (2) at least one member selected from a group consisting of bursty data and packetized data, said signal transmitting system including a multiplexer and a timing control block; and
   (B) a signal receiving system for reception of said signal without disrupting the laminarity of the latency free continuous data, said signal receiving system including a demultiplexer and a sequence detector;

(C) a network access port for simultaneous (1) full duplex messaging between a first user and a second user and (2) management of a network including dynamic real-location of network resources, said network access port being connected to both said multiplexer and said demultiplexer, wherein said network access port includes at least one subport selected from the group consisting of an RS232 subport with a full hand shake interface, an RS422 subport, an RS485 subport, a SCSI subport and a full duplex packetized data subport.

3. The apparatus of claim 2, wherein said multiplexer includes a time division multiplexer, said signal transmitting system includes an analog-to-digital convertor for simultaneous transmittal of base band latency free continuous real time audio and video data, said demultiplexer includes a time division demultiplexer and said signal receiving system includes a digital-to-analog convertor for simultaneous reception of base band latency free continuous real time audio and video data.

4. The apparatus of claim 3, further comprising a wavelength division multiplexer coupled to said time division multiplexer and a wavelength division demultiplexer coupled to said time division demultiplexer.

5. The apparatus of claim 2, further comprising a full duplex dedicated router interconnect connected to both said signal transmitting system and said signal receiving system, said full duplex dedicated router interconnect being selected from the group consisting of a single full duplex wave division multiplexer optical fiber and a pair of simplex optical fibers.

6. The apparatus of claim 2, wherein said network access port includes at least one subport selected from the group consisting of an RS232 subport with fill hand shake support, an RS422 subport, an RS485 subport, a SCSI subport and a full duplex 10 Mb/sec packetized data subport.

7. The apparatus of claim 2 wherein said network access port includes a subport for asynchronous data communication.

8. The apparatus of claim 2, further comprising a switch for dropping and adding signals connected to at least one of said multiplexer and said demultiplexer.

9. The apparatus of claim 2, further comprising a 2:1 bypass switch for redundant switching, said 2:1 bypass switch being coupled to said demultiplexer.

10. A method of communicating a serialized signal, comprising:

(A) providing a signal transmitting system and a signal receiving system, said transmitting system including a time division multiplexer, a timing control circuit, and a memory buffer, and said receiving system including a time division demultiplexer;

(B) receiving a first stream of data at said signal transmitting system from a first data source, and then providing said first stream of data to a first input channel of said time division multiplexer, said first stream of data comprising latency free continuous data;

(C) receiving a second stream of data at said signal transmitting system from a second data source, said second stream of data comprising at least one member selected from the group consisting of bursty data and packetized data, said receiving step including (1) providing said second stream of data to said memory buffer and (2) controlling the flow of said second stream of data through said memory buffer using said timing control circuit to modify timing characteristics of said second stream of data, and then providing said second stream of data to a second input channel of said time division multiplexer;

(D) time division multiplexing said first and second streams of data using said time division multiplexer to produce said serialized signal in the form of a third stream of data that is a time-multiplexed combination of said first and second streams of data;

(E) transmitting said third stream of data on a single tie line using said signal transmitting system;

(F) receiving said third stream of data from said single tie line using said signal receiving system; and (G) time division demultiplexing said third stream of data using said time division demultiplexer to recover said first and second streams of data, said first and second streams of data being produced at first and second output channels of said time division demultiplexer.

11. The method of claim 10, wherein the step of providing includes providing a drop-add switch for dropping and adding signals, said drop-add switch being connected to both said time division multiplexer and said time division demultiplexer and, further comprising, reconfiguring said drop-add switch using data from said signal.

12. The method of claim 10, wherein said memory buffer comprises a first-in-first-out memory buffer.

13. The method of claim 12, wherein said first-in-first-out memory buffer is approximately eight bits deep.

14. The method of claim 10, wherein said first stream of data is an uncompressed stream of data, said uncompressed stream of data comprising at least one member selected from the group consisting of real time video data and real time audio data, and said uncompressed data stream being produced by sampling said first data source, said first data source being an analog signal source.

15. The method of claim 10, wherein said time division multiplexing step is performed entirely at a physical layer of said transmitting system and said time division demultiplexing step is performed entirely at a physical layer of said receiving system.

16. The method of claim 10, wherein said memory buffer is a first memory buffer and said timing control circuit is a first timing control circuit, and wherein the method further comprises the following steps, which are performed after said time division demultiplexing step providing said second stream of data to a second memory buffer, and controlling the flow of said second stream of data through said second memory buffer using a second timing control circuit.

17. The method of claim 16, wherein said first and second memory buffers respectively comprise first and second first-in-first-out memory buffers.

18. The method of claim 16, wherein said second timing control circuit comprises a state machine.

19. The method of claim 10, further comprising receiving a fourth stream of data at said transmitting system, said fourth stream of data comprising at least one member selected from the group consisting of wide area network data and asynchronous transfer mode data, and wherein said third data stream is also a time division multiplexed combination of said fourth data stream.

20. A communication system comprising:

(A) a tie line;

(B) a signal transmitting system, including
  (1) a time division multiplexer, including
    (a) a first multiplexer input channel, said first multiplexer input channel receiving a first stream of data, said first stream of data comprising latency free continuous data and being received from a first data source,
    (b) a second multiplexer input channel, said second multiplexer input channel receiving a second stream of data, said second stream of data comprising at least one member selected from a group consisting of bursty data and packetized data, and said second stream of data being received from a second data source,
    (c) a multiplexer output channel, said multiplexer output channel being coupled to said tie line and transmitting a third stream of data over said tie line, said third stream of data being a time division multiplexed combination of said fist and second streams of data,
  (2) a timing control circuit, and
  (3) a memory buffer, said memory buffer being interconnected between said second multiplexer input channel and said second data source, and said memory buffer being controlled by said timing control circuit to store bits of data from said second steam of data for variable periods of time as said second stream of data passes through said memory buffer; and
(C) a signal receiving system, including a time division demultiplexer including
  (1) a demultiplexer input channel, said demultiplexer input channel being coupled to said multiplexer output channel by way of said tie line,
  (2) a first demultiplexer output channel, said first demultiplexer output channel outputting said fist stream of data, and
  (3) a second demultiplexer output channel, said second demultiplexer output channel outputting said second stream of data.

21. The communication system of claim 20, wherein said memory buffer comprises a first-in-first-out memory buffer.

22. The communication system of claim 21, wherein said first-in-first-out memory buffer is approximately eight bits deep.

23. The communication system of claim 20, wherein said first stream of data is an uncompressed stream of data, said uncompressed stream of data being at least one member selected from the group consisting of real time video data and real time audio data, and said uncompressed data stream being produced by sampling said first data source, said first data source being an analog signal source.

24. The communication system of claim 20,
  wherein said memory buffer is a first memory buffer and said timing control circuit is a first timing control circuit, and
  wherein said receiving system further includes
    a second timing control circuit, and
    a second memory buffer, said memory buffer being coupled to said second demultiplexer output channel and receiving said second stream of data, and said memory buffer being controlled by said second timing control circuit.

25. The method of claim 24, wherein said first and second memory buffers respectively comprise first and second first-in-first-out memory buffers.

26. The method of claim 24, wherein said second timing control circuit comprises a state machine.

27. The communication system of claim 20, wherein said transmitting system includes an analog-to-digital convertor that is interconnected between said first data source and said first multiplexer input channel, and wherein said demultiplexer includes digital-to-analog convertor that is connected to said first demultiplexer output channel.

28. Apparatus, comprising:
  (A) a signal transmitting system for transmittal of a serialized signal including (1) latency free continuous data and (2) at least one member selected from the group consisting of bursty data and packetized data, said signal transmitting system including (1) a multiplexer, (2) a timing control block connected to said multiplexer, (3) a first FIFO memory buffer having an almost empty flag, said first FIFO being connected to both said multiplexer and said timing control block, (4) a clock multiplier connected to said multiplexer and (5) an analog-to-digital convertor connected to said multiplexer; and
  (B) a signal receiving system for reception of said signal without disrupting the laminarity of the latency free continuous data, said signal receiving system including (1) a demultiplexer (2) a state machine connected to said demultiplexer, (3) a second FIFO memory buffer connected to both said demultiplexer and said state machine and (4) a digital-to-analog convertor connected to said demultiplexer.

29. An apparatus comprising:
  (A) a signal transmitting system for transmittal of a serialized signal including (1) latency free non-compressed continuous data and (2) at least one member selected from a group consisting of bursty data and packetized data, said signal transmitting system including a multiplexer and a timing control block; and
  (B) a signal receiving system for reception of a signal without disrupting the laminarity of the latency free continuous data, said signal receiving system including a demultiplexer and a sequence detector;
  (C) a switch for dropping and adding signals connected to at least one of said multiplexer and said demultiplexer; and
  (D) a network access port for simultaneous (1) full duplex messaging between a first user and a second user and (2) management of a network including dynamic reallocation of network resources, said network access port being connected to said switch for dropping and adding signals,
    wherein said network access port includes at least one subport selected from the group consisting of an RS232 subport with a full hand shake interface, an RS422 subport, an RS485 subport, a SCSI subport and a fill duplex packetized data subport.

30. The apparatus of claim 29 wherein said network access port includes a subport for asynchronous data communication.

* * * * *